(12) United States Patent
Kobayashi

(10) Patent No.: US 6,711,803 B1
(45) Date of Patent: Mar. 30, 2004

(54) METHOD OF JOINING STEEL PRODUCTS, METHOD OF PROCESSING JUNCTION SURFACES OF STEEL PRODUCTS, AND REINFORCING MEMBER

(75) Inventor: Kiyokazu Kobayashi, Chiba (JP)

(73) Assignee: Takashima Corporation, Tokyo (JP)

( * ) Notice: Subject to any disclaimer, the term of this patent is extended or adjusted under 35 U.S.C. 154(b) by 0 days.

(21) Appl. No.: 09/622,884

(22) PCT Filed: Dec. 20, 1999

(86) PCT No.: PCT/JP99/07136

§ 371 (c)(1),
(2), (4) Date: Aug. 23, 2000

(87) PCT Pub. No.: WO00/38878

PCT Pub. Date: Jul. 6, 2000

(30) Foreign Application Priority Data

Dec. 25, 1998 (JP) .......................................... 10-370260
Sep. 8, 1999 (JP) .......................................... 11-254750

(51) Int. Cl.⁷ ...................... B21D 35/00; B21D 5/00; B23P 11/00; B23K 31/02; B21B 15/00
(52) U.S. Cl. ...................... 29/469.5; 29/425; 29/521; 29/450; 228/173.1; 228/173.2; 228/174; 228/173.3; 72/83; 72/177; 72/180
(58) Field of Search .......................... 228/173.4, 173.1, 228/174, 173.2, 173.3, 173.6; 29/450–453, 897.32, 469.5, 463, 521, 425; 72/83, 177, 180

(56) References Cited

U.S. PATENT DOCUMENTS

| | | | | |
|---|---|---|---|---|
| 3,596,724 A | * | 8/1971 | Bechem ........................ | 175/91 |
| 3,695,078 A | * | 10/1972 | Bruinsma ..................... | 606/60 |
| 3,722,076 A | * | 3/1973 | Dent ............................ | 29/516 |
| 3,734,322 A | * | 5/1973 | Vaillancourt ................. | 214/450 |
| 3,811,308 A | * | 5/1974 | Marcovitch ................... | 72/210 |
| 3,827,269 A | * | 8/1974 | Hoagland et al. ............. | 72/108 |
| 3,833,242 A | * | 9/1974 | Thompson, Jr. ............. | 280/281 |
| 4,027,517 A | * | 6/1977 | Bodnar ......................... | 72/177 |
| 4,055,976 A | * | 11/1977 | Kraft ............................. | 72/83 |
| 4,385,429 A | | 5/1983 | Crankshaw | |
| 4,411,147 A | * | 10/1983 | Capuano ...................... | 72/220 |
| 4,591,687 A | * | 5/1986 | Urech .......................... | 219/93 |
| 4,643,464 A | * | 2/1987 | Weinhold .................... | 285/233 |
| 4,715,210 A | * | 12/1987 | Bishop et al. ................ | 72/400 |
| 4,765,167 A | * | 8/1988 | Sampson ...................... | 72/68 |
| 4,820,100 A | * | 4/1989 | Riviere ......................... | 413/6 |

(List continued on next page.)

FOREIGN PATENT DOCUMENTS

| | | | |
|---|---|---|---|
| DE | 2912182 A1 | * | 10/1980 |
| JP | 50-53016 | | 5/1975 |
| JP | 63-172892 | | 7/1988 |
| JP | 3-126556 | | 12/1991 |
| JP | 06-58318 A | * | 3/1994 |
| JP | 9-165826 | | 6/1997 |
| JP | 2662940 | | 10/1997 |
| JP | 2843932 | | 1/1999 |
| JP | 11-151544 A | * | 6/1999 |

*Primary Examiner*—L. Edmondson
(74) *Attorney, Agent, or Firm*—Frommer Lawrence & Haug LLP; William S. Frommer; Matthew K. Ryan

(57) ABSTRACT

The present invention enables to firmly assemble a steel-frame structure. To form a steel-frame structure or to join two steel members being reinforcing members thereof, a slip-proof surface having one or plural concentric higher parts and grooves is formed on the joined surface of one side or both sides of the steel members, and these two steel members are clamped by a connecting member that passes through connecting holes in the state where the first and the second slip-proof surfaces are mutually engaged or not engaged. Thus, joining force between the joined surfaces is increased.

4 Claims, 29 Drawing Sheets

U.S. PATENT DOCUMENTS

| | | | | |
|---|---|---|---|---|
| 4,945,624 A | * | 8/1990 | Toti | 29/453 |
| 5,075,175 A | * | 12/1991 | Matsui et al. | 428/582 |
| 5,230,459 A | * | 7/1993 | Mueller et al. | 228/164 |
| 5,244,746 A | * | 9/1993 | Matsui et al. | 428/609 |
| 5,246,256 A | * | 9/1993 | Rung et al. | 138/109 |
| 5,481,084 A | * | 1/1996 | Patrick et al. | 219/123 |
| 5,685,663 A | * | 11/1997 | Sadri | 403/2 |
| 5,794,400 A | * | 8/1998 | Fisher et al. | 156/294 |
| 5,803,671 A | * | 9/1998 | Gray | 29/463 |
| 5,823,701 A | * | 10/1998 | Goto | 403/10 |
| 5,829,947 A | * | 11/1998 | Litten | 414/537 |
| 5,836,506 A | * | 11/1998 | Hunt et al. | 228/172 |
| 5,857,292 A | * | 1/1999 | Simpson | 52/22 |
| 5,863,397 A | * | 1/1999 | Tu et al. | 156/294 |
| 5,975,987 A | * | 11/1999 | Hoopman et al. | 421/28 |
| 6,071,389 A | * | 6/2000 | Zhang | 204/298.12 |
| 6,223,826 B1 | * | 5/2001 | Chau et al. | 166/380 |
| 6,253,520 B1 | * | 7/2001 | Houk | 52/592.2 |
| 6,287,310 B1 | * | 9/2001 | Fox | 606/60 |

* cited by examiner

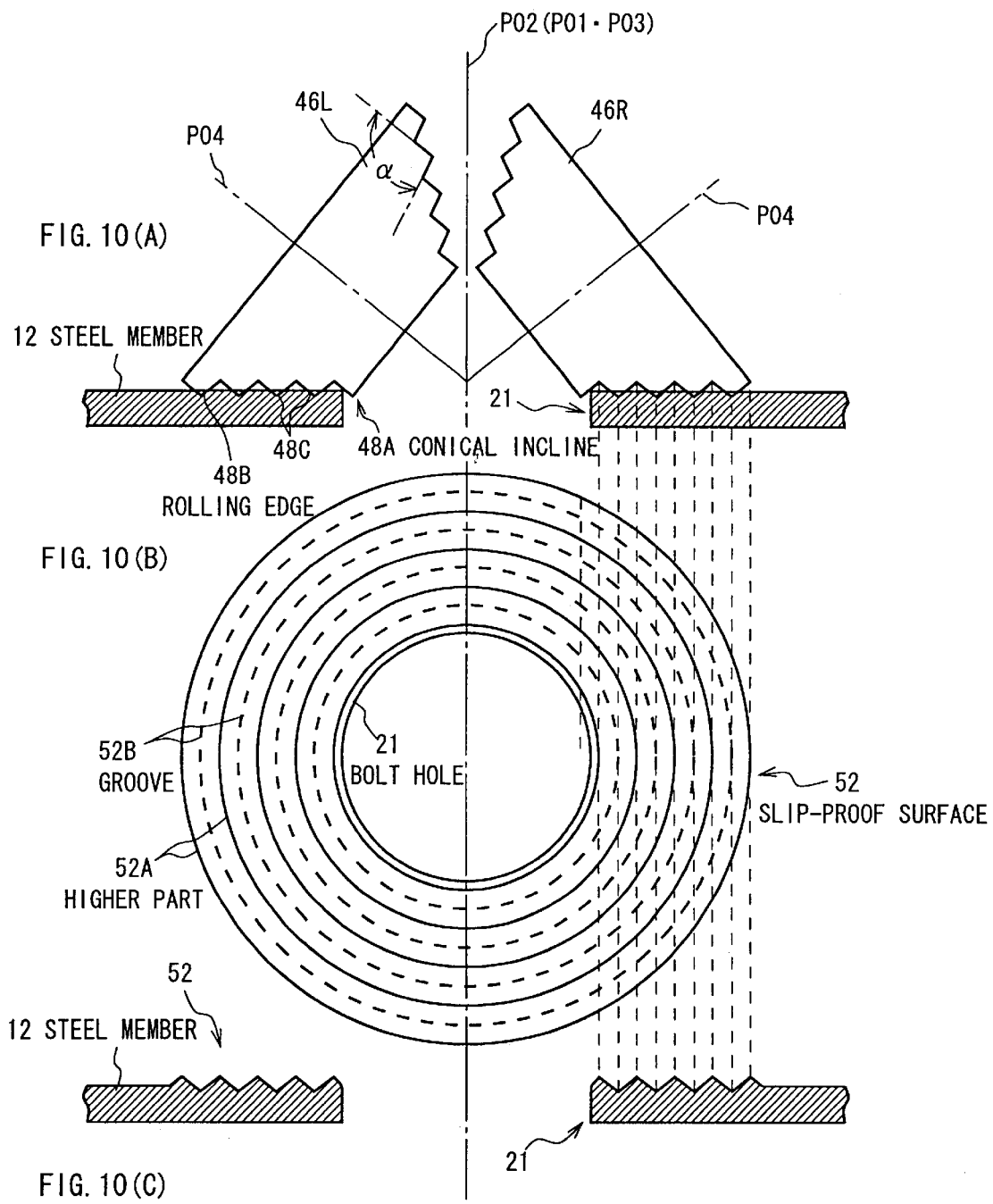

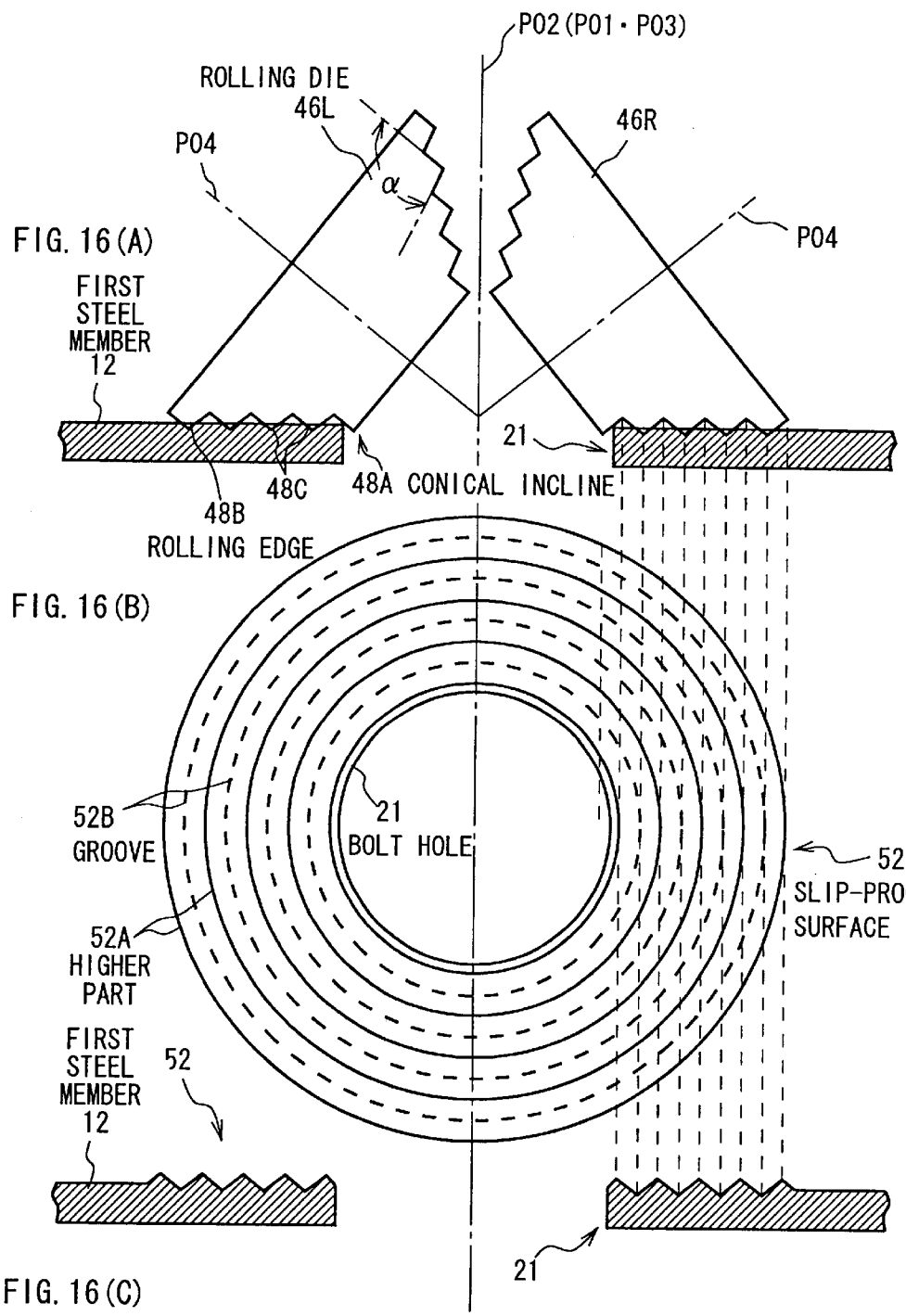

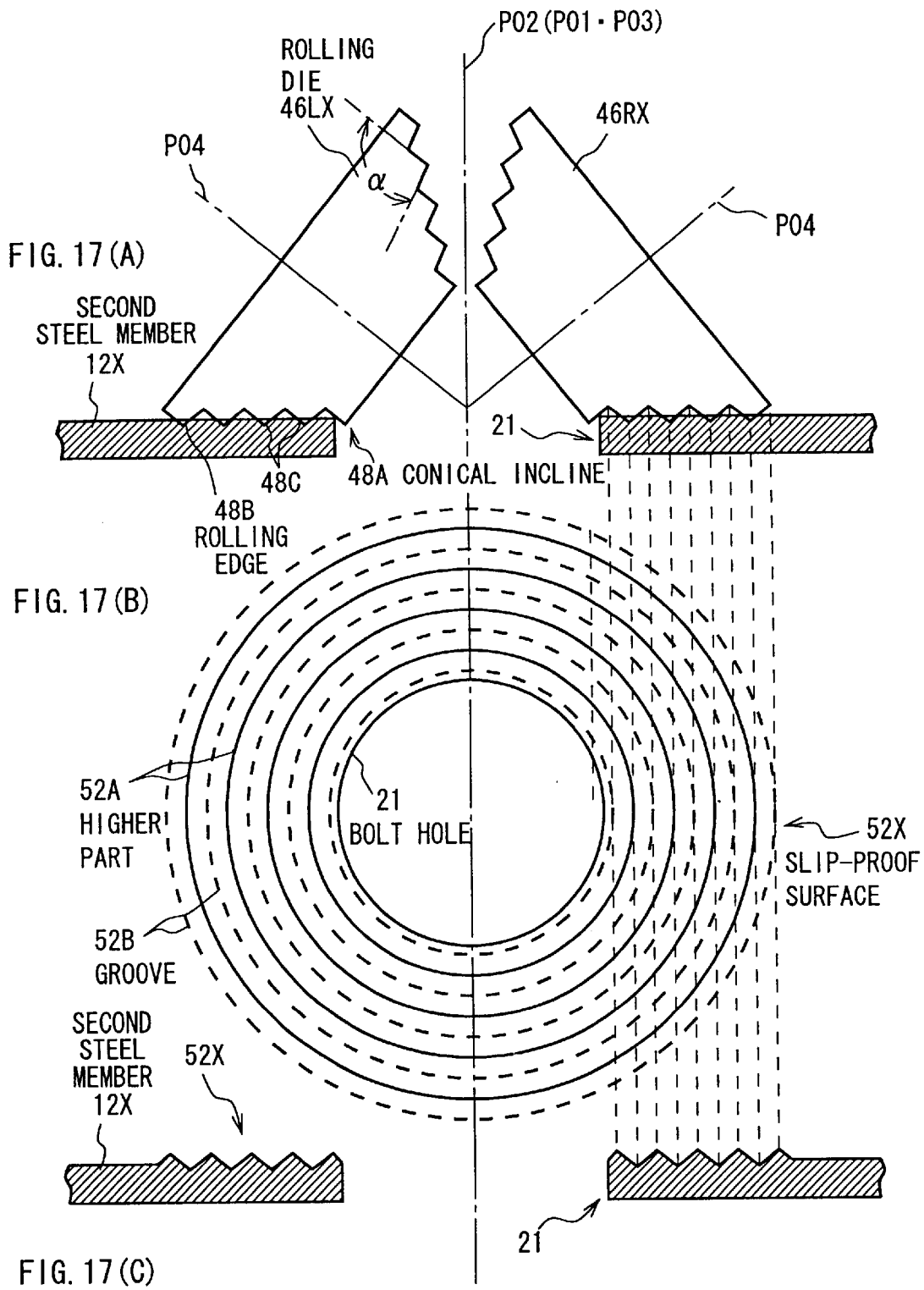

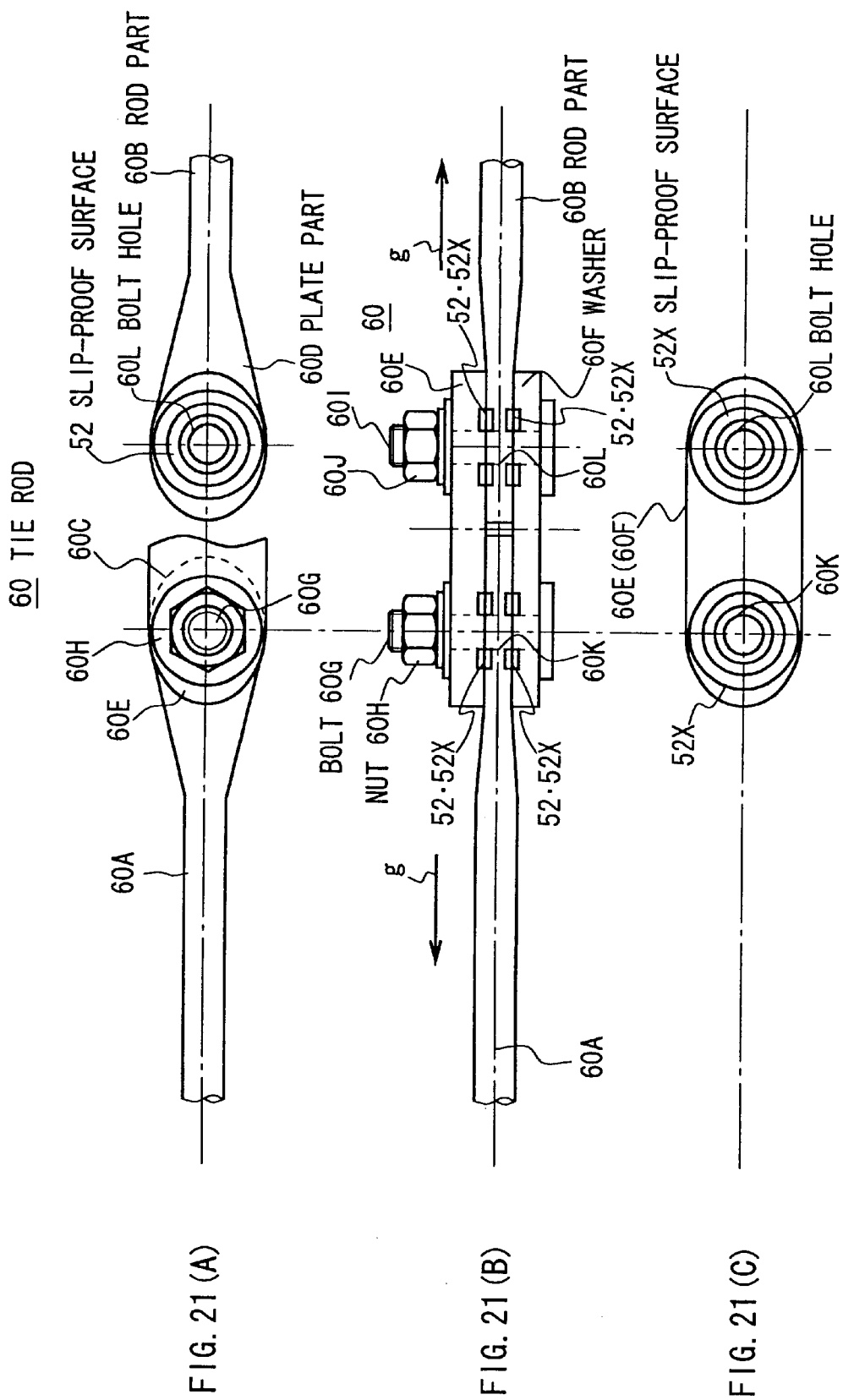

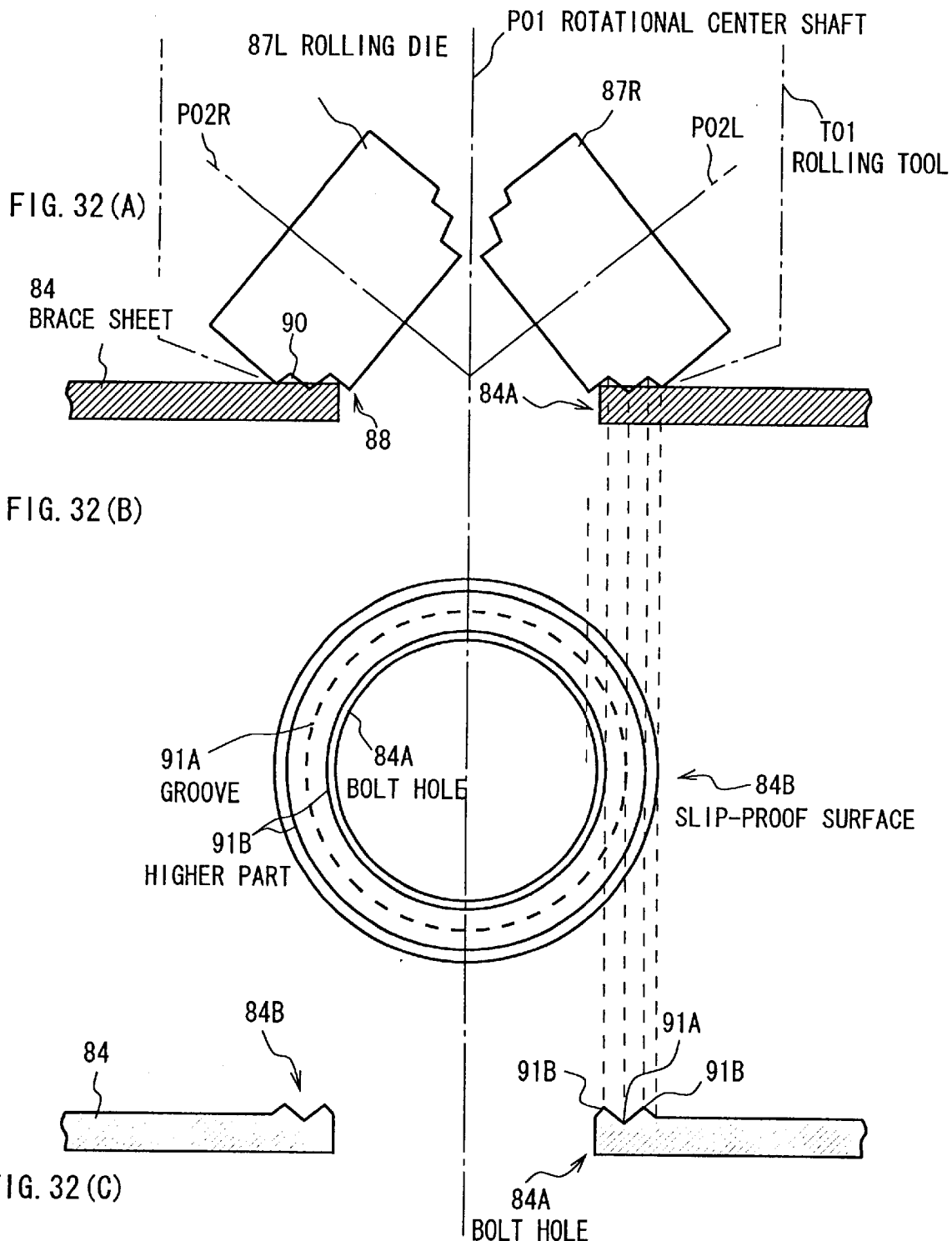

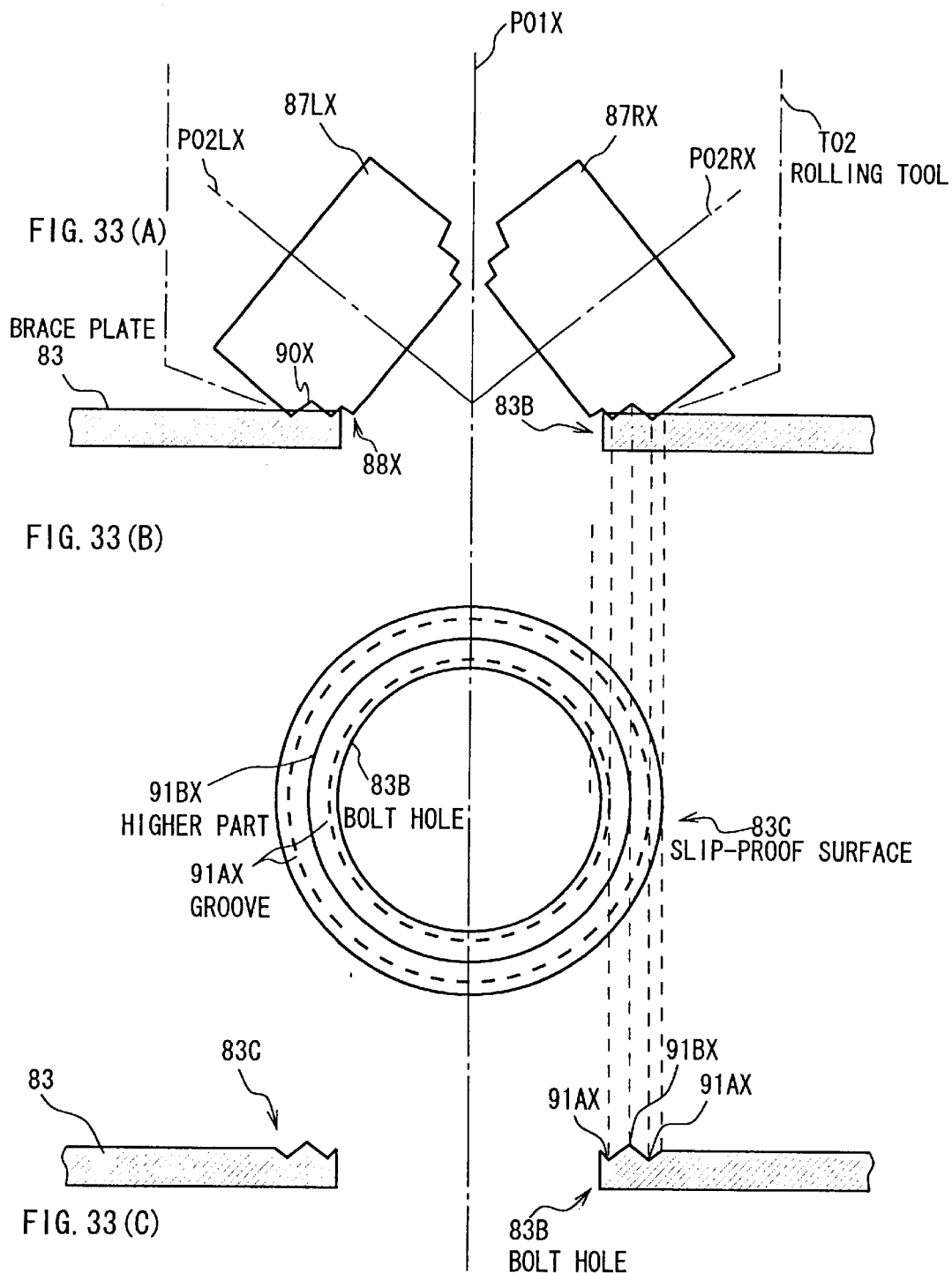

| NO | BOLT DIAMETER | BOLT TYPE | FORM ROLLING | SCREW TORQUE | LOAD (kN) |
|---|---|---|---|---|---|
| 1 | M22 (1) | HIGH POWER | X | 5600 | 35.5 |
| 2 | M22 (1) | HIGH POWER | X | 5600 | 39.0 |
| 3 | M22 (1) | HIGH POWER | O | 5600 | 172.0 |
| 4 | M22 (1) | HIGH POWER | O | 5600 | 207.5 |
| 5 | M22 (1) | MEDIUM | O | 4800 | 168.0 |
| 6 | M22 (1) | MEDIUM | O | 4800 | 208.0 |
| 7 | M22 (2) | HIGH POWER | X | 5600 | 65.2 |
| 8 | M22 (2) | HIGH POWER | X | 5600 | 79.4 |
| 9 | M16 (1) | HIGH POWER | O | 3000 | 180.0 |
| 10 | M16 (1) | HIGH POWER | O | 3000 | 177.1 |
| 11 | M16 (1) | MEDIUM | O | 1550 | 157.0 |
| 12 | M16 (1) | MEDIUM | O | 1550 | 134.2 |
FIG. 37
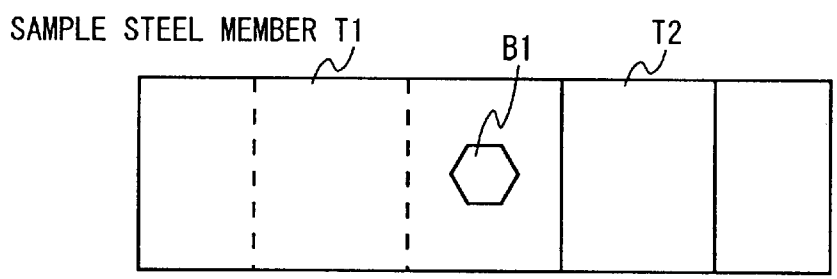
FIG. 38 (A)
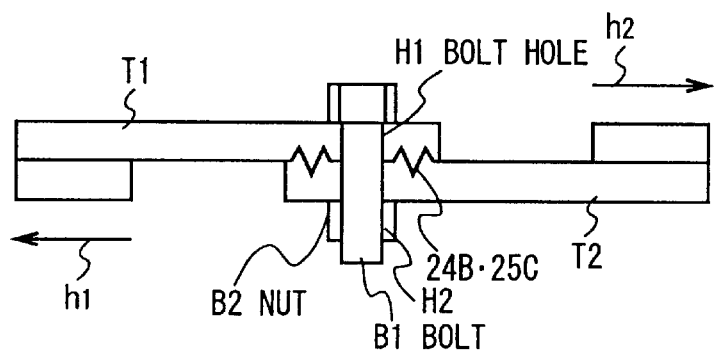
FIG. 38 (B)

METHOD OF JOINING STEEL PRODUCTS, METHOD OF PROCESSING JUNCTION SURFACES OF STEEL PRODUCTS, AND REINFORCING MEMBER

TECHNICAL FIELD

The present invention relates to a method of joining steel members, a method of processing the joined surface of a steel member and a reinforcing member. For example, the steel members are overlapped and clamped by a connecting member such as a bolt, a rivet, etc., so that they can be firmly joined with the joined surfaces.

BACKGROUND

In construction fields of a steel-frame structure such as a structure, a bridge, etc., to join large steel plates or steel frames or the like, the technique in which one side of them are mutually directly overlapped or a strap is put on it and clamping by a bolt or a rivet has been adopted.

As the above, if the coefficient of friction on the joined surfaces between the materials of the structure such as steel plates or steel frames, or and a material that will be used to join them (hereinafter, these materials are referred to as steel members) is small, when the steel members are clamped in temporary tightening or permanent tightening by a bolt or a rivet, there is a fear that the faces of the steel members are mutually shifted in the directions to shear the bolt because the dead load of the steel members are loaded on the joint of the steel members; thus the steel-frame structure cannot be constructed according to the specification of design.

As to this point, in conventional cases, a method in which the steel members are previously left outside before assembling the steel-frame structure to make the joined surfaces of the steel members get rusty so that the coefficient of friction between the joined surfaces makes large has been adopted. If adopting this method, however, there is a problem that the assembly work of the steel-frame structure is further complicated.

On the other hand, as methods to solve this problem, working tools to increase frictional force on a joined surface have been provided by the Japanese Patent Application numbers Hei6-171536 and Hei7-179291.

Furthermore, in the steel-frame structure such as a structure or a bridge, for example, as shown in FIG. 1 of a steel-frame structure 1, plural vertical steel members 3 are provided at prescribed intervals between a pair of cross beam steel members 2A and 2B that are mutually in parallel as connecting them, and the both ends of the vertical steel member 3 are fixed to the cross beam steel members 2A and 2B. And plural frame structure parts 4 are sequentially formed in array in the direction extending the cross beam steel members 2A and 2B. Strut reinforcing members 5 are fixed to between the corners mutually opposite of each frame structure part 4. The strut reinforcing member 5 which functions as reinforcing means to the deforming of each frame structure part 4 has been used.

The strut reinforcing member 5 is composed of brace members 6 of which the both ends are fixed to the opposite corners of the frame structure part 4, and a tension member 7 connected to between the brace members 6 that are mutually obliquely opposite. The tension members 7 pull the four corners of the frame structure part 4 inward. Therefore, for example, if an earthquake occurs and the cross beam steel members 2A and 2B and the vertical steel members 3 of the frame structure part 4 is about to oscillate in mutually shifting direction, this is prevented by the tensile force by the tension members 7. Thus, the quakeproof ability of the frame structure part 4 can be improved.

By the way, if the above steel-frame structure 1 becomes in a massive scale, a load on the strut reinforcing member 5 when an earthquake was occurred becomes large. Therefore, the intensity of each part must be increased. More particularly, the brace member 6 to be fixed to the tension member 7 to the four corners of the frame structure part 4 is necessary to have a sufficient intensity.

As shown in FIG. 2, the brace member 6 has a plate like steel member 8 (this is referred to as brace sheet) of which the outer edges 8A and 8B are fixed by welding to the cross beam steel members 2A or 2B and the vertical steel member 3 of the frame structure part 4, and a plate like connecting steel member 9 (this is referred to as brace plate) welded to the both ends of a tension member 7 that is a stick steel member for example. Two bolt holes 10A and 10B drilled in the brace sheet 8 and the brace plate 9 are clamped by bolts, so that the brace plate 9 is joined by pressure to the brace sheet 8. Here, in the pressure joint method employed, a bolt is contacted to the inside surface of the bolt holes 10A and 10B so as to prevent the slippage between the brace plate 9 and the brace sheet 8.

Thus, when an earthquake occurred, a load on the tension member 7 is propagated from the brace plate 9 to the brace sheet 8 through a bolt passing through the bolt holes 10A and 10B.

Then, practically, when a load is large, a method that at least two or more pieces of bolts are used to fix the brace plate 9 to the brace sheet 8 and strongly unifying the brace plate 9 and the brace sheet 8 by clamping power and antishear force by the above two or more pieces of bolts has been adopted.

If adopting this method, however, the following phenomenon occurs. As shown in FIG. 3, the direction D1 that the bolt holes 10A and 10B are aligned and the tensile direction D2 by the tension member 7 do not coincide, so that if the tension member 7 is pulled to a direction different from the arranged direction D1 that the bolt holes are aligned, the brace plate 9 turns to a direction matching with the tensile direction D2 centering the bolt passing through the front bolt hole 10A. Thus, as shown in FIG. 4, the rear bolt hole 10B is deviated from a fixed position 10B1 when the brace plate 9 was fixed to the brace sheet 8 in construction to a deviated position 10B2 deviated by the turn of the brace plate 9.

At this time, since the brace plate 9 moves to the direction deviated from the brace sheet 8, a shearing force functions to the bolt passing through the rear bolt hole 10B by the edge of the bolt hole 10B on the brace plate 9, and the bolt is sheared or the shape of the edge of the bolt hole 10B is broken. Thus, the joined force of the brace plate 9 and the brace sheet 8 lowers.

In this manner, according to the brace member 6 of FIG. 2, since the joined force of the brace plate 9 and the brace sheet 8 lowers when an earthquake occurred, the function of the strut reinforcing members 5 to the frame structure part 4 is deteriorated; and thus, there is a fear that the quake-proof ability of the frame structure part 4 becomes weakened.

DISCLOSURE OF INVENTION

Considering the above points, the present invention provides a method of and an apparatus for joining steel members and a method of and an apparatus for processing a joined surface to join the joined surfaces of the steel members as firm as possible by a simple technique.

Furthermore, the present invention provides a reinforcing member which can prevent the lowering of a function as a reinforcing member with a simple configuration.

To obviate such problems according to the present invention, as describing below comparing with the embodiments, a rolling die 46L(46R) in which a rolling edge 48B having one or plural concentric higher parts has been formed on a conical incline 48A is rolled around a connecting hole 21 already drilled or to be drilled later in the steel member 12 in the state where the conical incline 48A is contacted to the joined surface of the steel member 12 and pressed by prescribed constant pressure obtained by pressure setting means 42B, 58A to 54C and 57, so that a slip-proof surface 52 having a pair or plural pairs of concentric recessed and projected parts is formed around the connecting hole 21.

Furthermore, according to the present invention, in a method of and an apparatus for joining steel members for mutually overlapping the joined surfaces of a first and a second steel members 12 and 2X and fixing by pressure welding the first and the second steel members 12 and 12X by a connecting member passing through connecting holes 21 drilled in the joined surfaces, and joining the first and the second steel members 12 and 12X, with respect to the joined surfaces of the first and the second steel members 12 and 12X, before fixing by the pressure welding, the conical incline 48A is pressure-welded to a position concentrical with the joining hole 21, by means of a rolling die 46R(46L) forming a rolling edge 48B that has one or plural concentric higher parts 38A on a conical incline 48A, so that a first and a second slip-proof surfaces 52 and 52X which respectively have a pair of or plural pairs of concentric recessed and projected parts are respectively formed at the positions mutually shifted around the connecting holes 21 of the first and the second steel members 12 and 12X, and the first and the second steel members 12 and 12X are joined by mutually overlapping the first and the second slip-proof surfaces 52 and 52X so as to engage so that the concentric recessed and projected parts of the first slip-proof surface 52 is fitted into the concentric recessed and projected parts of the second slip-proof surface 52X.

Moreover, in a reinforcing member 80 having a junction member 82 at the both ends of a tension member 81 to join the above tension member 81 to a steel-frame structure 1 and supporting a tensile load from the steel-frame structure 1 by the tension member 81, the junction member 82 comprises a first plate like junction steel member which is to be fixed to the steel-frame structure 1, and a second plate like junction steel member 83 which is to be fixed to the tension member 81, and a clamping member (85, 86) for clamping the first and the second junction steel members 84 and 83 in the state where a first and a second through holes 84A and 83B respectively drilled so as to pass through the thickness of the first and the second junction steel members 84 and 83 are passed through. The first junction steel member 84 has a first slip-proof surface 84B which has concentrical recessed and projected parts on one side or both sides, and the second junction steel member 83 has a second slip-proof surface 83C which has concentrical recessed and projected parts on one side of the first junction steel member 84. And the first and the second junction steel members 84 and 83 are joined in one body by overlapping and clamping them by the clamping member (85, 86) passing through the first and the second through holes 84A and 83B in the state where the recessed and projected parts of the first and the second slip-proof surfaces 84B and 83B are engaged as mutually fitting.

As the junction member 82 of the reinforcing member 80, the slip-proof surfaces 84B and 83C which have the concentrical recessed and projected parts are formed on a surface that the first and the second junction steel members 84 and 83 are contacted, and they are joined by an in-raw system so as to be engaged as mutually fitting. Thereby, the first and the second junction steel members 84 and 83 can be joined by a joining force sufficiently large.

According to the present invention, a slip-proof surface which has one or plural recessed and projected parts around a connecting hole of steel members is formed on the joined surface of steel members on a conical incline by form-rolling the joined surface of the steel members by prescribed constant pressure obtained by pressure setting means by means of rolling dies forming a rolling edge that has one or plural concentric higher parts. Therefore, a joined surface having a slip-proof surface in which a difference by "misshaping" to each part of the concentric recessed and projected parts is small can be accomplished.

Furthermore, since a slip-proof surface which has higher parts and grooves engaged so as to mutually fit is formed on a joined surface of steel members that are mutually joined, when the steel members are mutually clamped by a joining member, the slip-proof surfaces are mutually fit. Thus, the steel members can be firmly joined.

Moreover, as a joining member, a slip-proof surface having concentrical recessed and projected parts is formed on the surface to which a first and a second joined steel members will be contacted, and these are joined in the state as to be mutually fitted to be engaged by an in-raw system. Thereby, a reinforcing member which enables the first and the second joined steel members join in the state where a joint strength sufficiently large is kept can be accomplished.

BRIEF DESCRIPTION OF DRAWINGS

FIGS. 10(A) to 10(C) are schematic diagrams explaining a processing operation by the rolling die 46L(46R).

FIGS. 16(A) to 16(C) are schematic diagrams explaining a processing operation to form a slip-proof surface 52 by the rolling die 46L(46R).

FIGS. 17(A) to 17(C) are schematic diagrams explaining a processing operation to form a slip-proof surface 52X by a rolling die 46LX(46RX).

FIGS. 21(A) to 21(C) are a plan view, a side view and a front view showing a joint method in which in a tie rod 60, rod parts 60A and 60B are joined by washers 60E and 60F.

FIGS. 32(A) to 32(C) are schematic diagrams explaining a processing operation to form a slip-proof surface 84B on a brace sheet 84 by means of a rolling die 87L(87R).

FIGS. 33(A) to 33(C) are schematic diagrams explaining a processing operation to form a slip-proof surface 83C by means of a rolling die 87LX(87RX).

FIGS. 34(A) and 34 (B) are side elevational views illustrating the rolling dies 87L(87R) and 87LX(87RX).

FIG. 37 is a chart showing a slip test result.

FIGS. 38(A) and 38(B) are a plane view and a side elevational view illustrating the structure of a subject for load test.

BEST MODE FOR CARRYING OUT THE INVENTION

An embodiment of the present invention will be described in detail with reference to the accompanying drawings.

Figure 5:
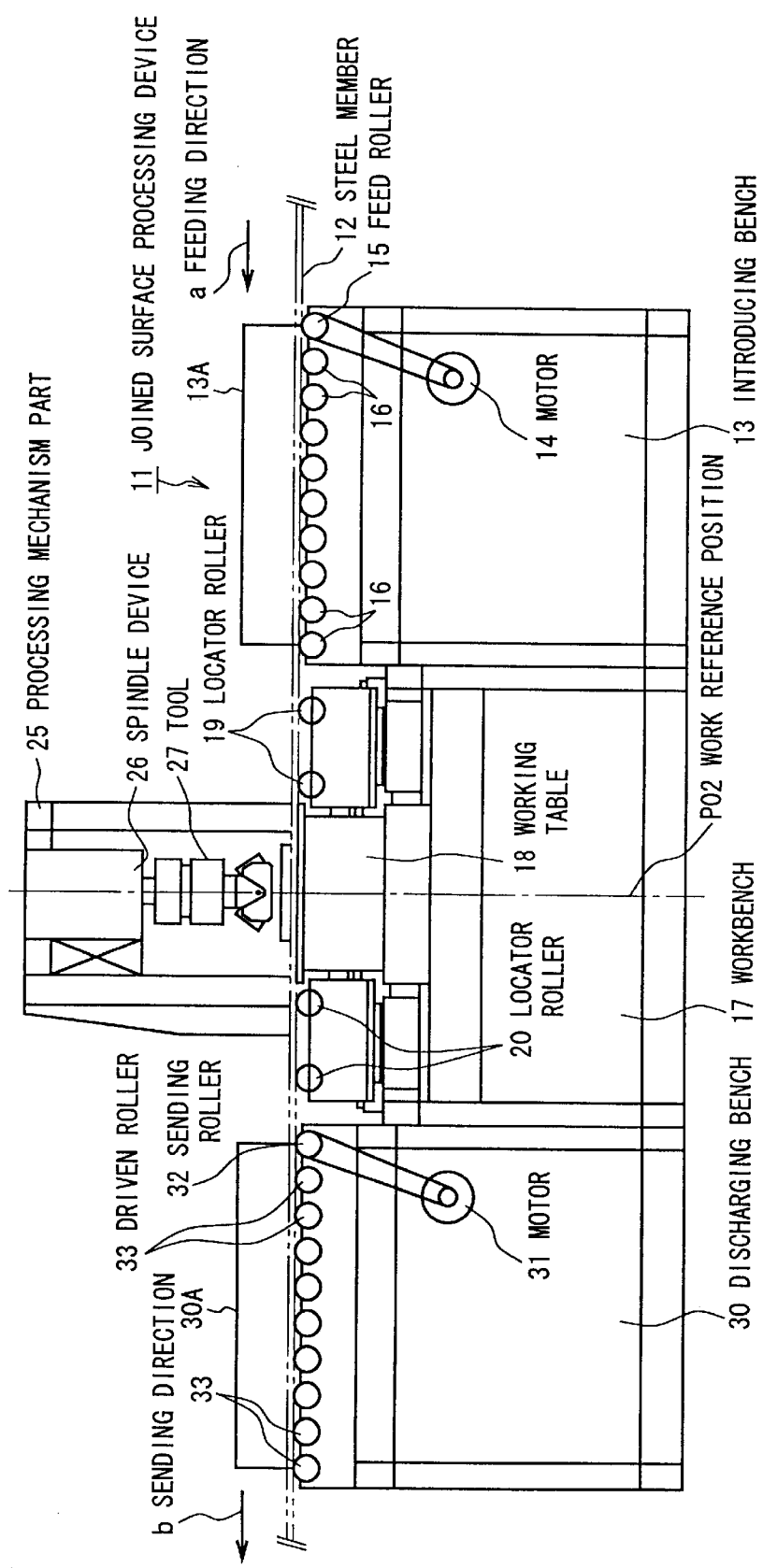
FIG. 5 is a front view showing an embodiment of a joined surface processing apparatus.
Figure 6:
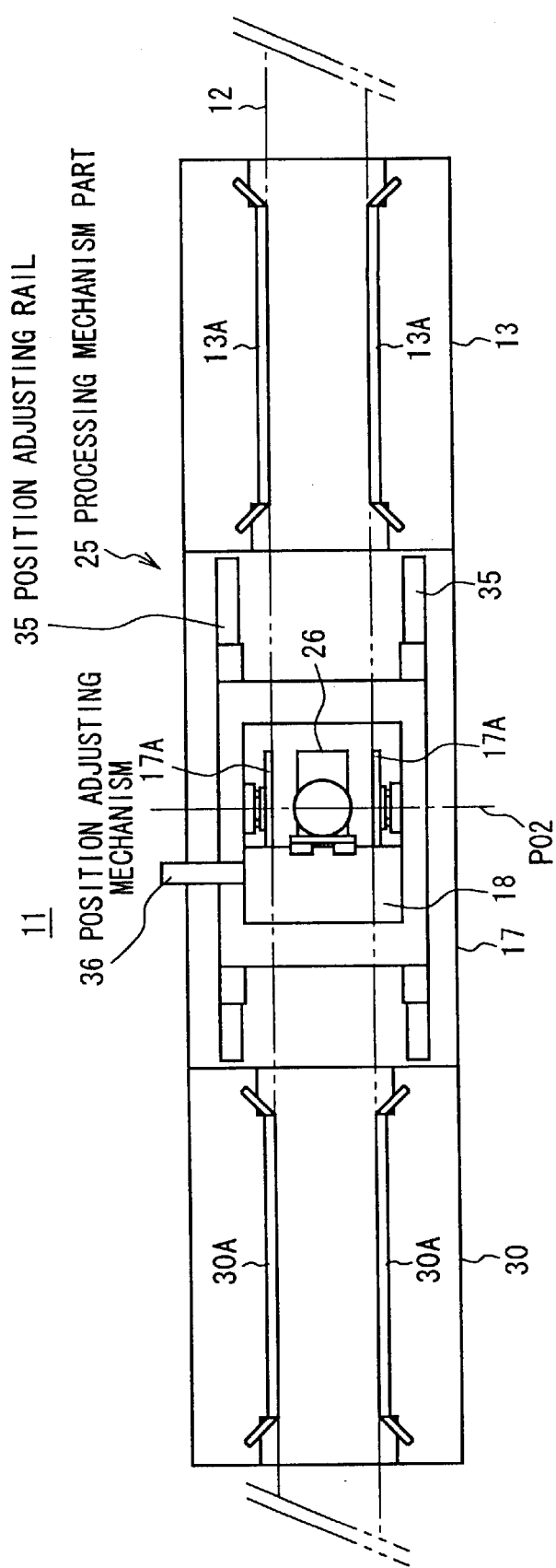
FIG. 6 is a plan view of the joined surface processing apparatus of FIG. 5.
Figure 11:
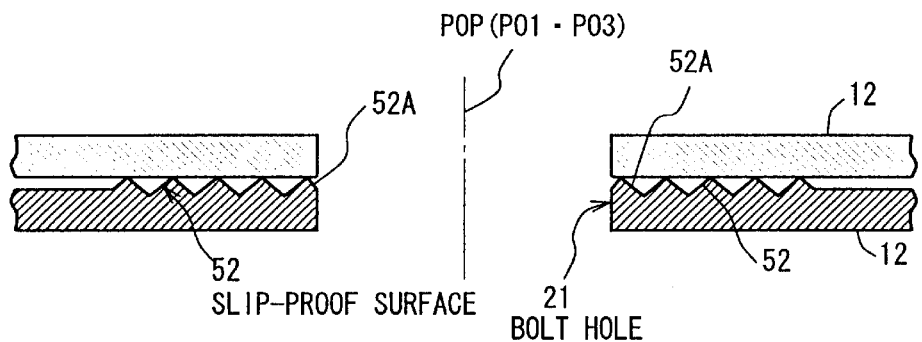
FIG. 11 is a sectional view showing the joined state of a slip-proof surface on the steel member 12.

[1] First Embodiment (1) General Configuration of Joined Surface Processing Apparatus Referring to FIGS. 5 and 6, 11 generally shows a joined surface processing apparatus. A steel member 12 which is conveyed by an automatic conveyer line in a steel member processing factory is fed onto a working table 18 on a workbench 17 in the feeding direction shown by an arrow "a" by a feed roller 15 driven by an electric motor for working automatic line 14 and driven rollers 16 that are provided on an introducing bench 13, along guide members 13A.

Figure 7:
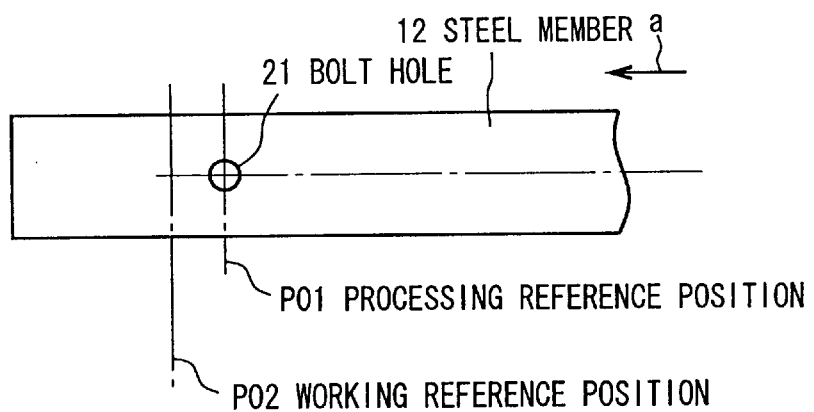
FIG. 7 is a plan view showing a steel member 12 to be processed.

On the workbench 17, locator rollers 19 and locator rollers 20 are provided before and after the working table 18 respectively. As shown in FIG. 7, the steel member 12 is positioned by means of guide members 17A on the position where the processing reference position PO1 of the steel member 12 (for example, the central position of a bolt hole 21 that functions as a connecting hole) agrees with the working reference position PO2 of the working table 18. Then, a joined surface processing tool 27 mounted on a spindle device 26 in a processing mechanism part 25 is rolled while performing pressure-welding to the steel member 12, and the steel member 12 is subjected to form rolling processing. In this case, the spindle device 26 rotationally drives an output shaft mounting the joined surface processing tool 27 by an electric motor, and performs pressure welding processing on the steel member 12 by a hydraulic device in the direction of the working table 18, and then rises for evacuation.

Thus processed steel member 12 is sent out by a sending roller 32 driven by a motor 31 and driven rollers 33 that are provided on a discharging bench 30 in the sending direction shown by an arrow "b" along guide members 30A.

The processing mechanism part 25 is mounted on position adjusting rails 35. Thus, the processing mechanism part 25 generally adjusts the position of the spindle device 26, i.e., the tool 27, in the feeding and sending direction of the steel member 12 (this is referred to as "x" direction), and adjusts the position of the spindle device 26 in the direction that is orthogonally crossing the feeding and sending direction of the steel member 12 (this is referred to as "y" direction) by a position adjusting mechanism 36.

Since the processing mechanism part 25 adjusts the position of the tool 27 in the "x" direction and the "y" direction when the steel member 12 being the object of joined surface processing is positioned on the working table 18, the position of the tool 27 is adjusted to the central position of a bolt hole 21 that has been previously drilled in the steel member 12.

(2) Joined Surface Processing Tool

Figure 8:
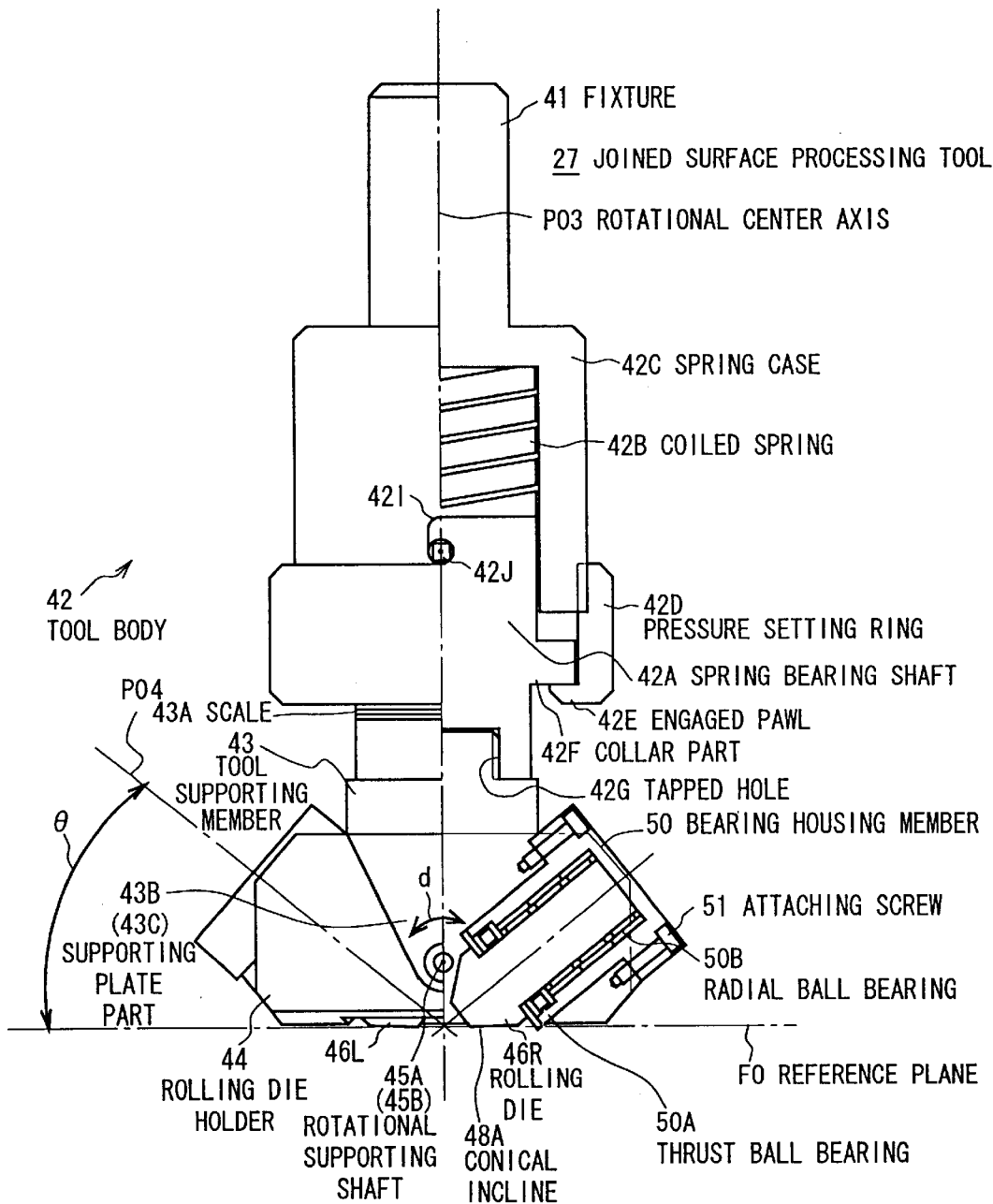
FIG. 8 is a front view showing a part of a tool 27 in FIG. 5 as a section.

As shown in FIG. 8, the joined surface processing tool 27 has a tool body 42 in which a fixture 41 to attach the tool 27 to the spindle device 26 is extended upward.

In the tool body 42, a spring bearing shaft 42A, one coiled spring 42B and a cylindrical spring case 42C are sequentially put on on a rotational center axis PO3. Thus, when the fixture 41 projecting upward from the spring case 42C is depressed, a pressing force corresponding to the spring force of the coiled spring 42B is transmitted to the spring bearing shaft 42A.

The bottom edge of the spring case 42C is extended to the position where is opposite to the outer circumferential surface of the spring bearing shaft 42A, and a pressure setting ring 42D is screwed on its outer circumferential surface. An engaged pawl 42E is provided on the bottom inside edge of the pressure setting ring 42D, and this is freely rotatably engaged with a collar part 42F provided on the bottom outer circumferential edge of the spring bearing shaft 42A. Thus, by screwing the pressure setting ring 42D on and compressing the coiled spring 42B, the coiled spring 42B can be set into a state showing a prescribed spring force.

The spring bearing shaft 42A is connected to the upper end part of a tool supporting member 43 by a screw hole 42G provided on the bottom surface. And whether or not the pressure setting ring 42D is into the state to generate the prescribed spring force can be visually confirmed by a scale 43A that is put on the position corresponding to the bottom edge of the pressure setting ring 42D of the tool supporting member 43.

In the case of this embodiment, an oblong hole 42I which extends on the berry part of the spring case 42C in the vertical direction is drilled, and a torque transmission pin 42J which is planted on the exterior surface of the spring bearing shaft 42A is protrusively engaged in the oblong hole 42I. Thus, if the spring case 42C is rotationally driven by the spindle device 26, the above rotational torque is transmitted to the spring bearing shaft 42A and the tool supporting member 43 via the oblong hole 42I and the torque transmission pin 42J.

The tool supporting member 43 has a U-shaped section. A rolling die holder 44 is disposed between a pair of supporting plate parts 43A and 43B that are mutually opposite at the longitudinal positions and are extending downward. And the rolling die holder 44 is axially supported freely rotatably in a direction shown by an arrow "d" to rotary supporting shafts 45A and 45B that are provided to protrude inward in the longitudinal direction at the top ends of the supporting plate parts 43A and 43B respectively.

The tool supporting member 43 has a pair of rolling dies 46L and 46R that roll at the symmetrical positions centering the rotational center axis PO3 of the tool 27. The rolling dies 46L and 46R have the same configuration, and as shown in FIG. 9(A), a conical trapezoid die head 48 is formed at the top end of a columned revolving shaft part 47 in one body.

Figures 9A, 9B:
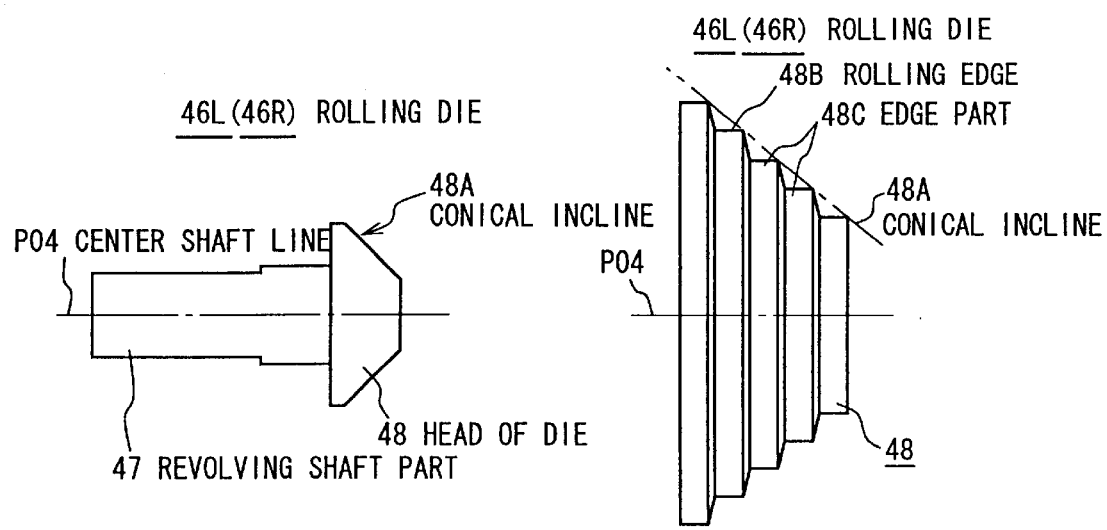
FIGS. 9(A) and 9(B) are side elevational views illustrating the detailed structure of a rolling die 46L(46R) in FIG. 8.

As shown in FIG. 9(B), on the conical incline 48A of the die head 48, a rolling edge 48B having an almost triangular waved section is concentrically formed centering a center axis PO4 along the conical incline 48A.

The rolling die 46L(46R) is freely rotatably held by thrust ball bearings 50A and radial ball bearings 50B in a bearing housing member 50 respectively, and the bearing housing member 50 is attached to the rolling die holder 44 by attaching screws 51. Thus, if the surface of the steel member 12 is not inclined, the rolling die 46L(46R) is held by the rolling die holder 44 in the state where the conical incline 48A is contacted to a reference plane FO that is orthogonally crossing the rotational center axis PO3 and in the state where the center axis PO4 is inclined to the reference plane FO by an attaching angle θ.

In this connection, in form rolling operation, for example, several tons of pressing force is given to the thrust ball bearings 50A, however, as a condition to stably receive such large pressing force by the contacted surface to the conical incline 48A of the steel member 12, preferably the attaching angle θ is selected to θ≈40°.

As shown in FIG. 10(A), in a form rolling work, in the state of being held by the rolling die holder 44 as the above, the conical incline 48A of the rolling die 46L(46R) is pressed against the surface of the steel member 12. In this state, the tool 27 is rotated, and the higher parts of the rolling edge 48B formed on the conical incline 48A are rolled while biting the surface of the steel member 12. Thus, as shown in FIGS. 10(B) and 10(C), the rolling edge 48B subjects plastic working to the surface of the steel member 12, and forming concentric recessed and projected parts having the same shape as the surface of the rolling edge 48B and the almost triangular waved section as a slip-proof surface 52.

In the case of this embodiment, the rolling edge 48B has four higher parts in an isosceles triangle and one higher part in a half of isosceles triangle: it is formed by edge parts 48C having such higher part, and as shown in FIG. 10(A), an apex angle a of the higher part of each edge part 48C is selected to α=60° to 170°.

According to the test, as shown in FIGS. 10(B) and 10(C), if the apex angle α is selected to 60° to 170°, recessed and projected parts having a practically sufficiently large intensity can be formed on the surface of the steel member 12 as a slip-proof surface 52. On the contrary, if the apex angle α is selected to 60° or less, the intensity of the recessed and projected parts shows a tendency to lower, and if it is selected to 170° or more, a tendency to increase the difficulty of the processing work of a slip-proof surface 52 is shown.

(3) Operation to Process Joined Surface and Effects

In the above structure, if the steel member 12 is fed from the introducing bench 13 onto the workbench 17 and the processing reference position PO1 of the bolt hole 21 that becomes a connecting hole in the steel member 12 is located at the position where coincides with the working reference position PO2 on the working table 18, the spindle device 26 of the processing mechanism part 25 performs position adjusting operation to the tool 27 in the "x" and the "y" directions. Thus, the rotational center axis PO3 coincides with the processing reference position PO1 of the bolt hole 21.

In this state, the spindle device 26 of the processing mechanism part 25 makes the rolling die 46L(46R) of the tool 27 down by a hydraulic pump while turning a main shaft by an electric motor, and making it press against the surface of the steel member 12.

Since the rolling die 46L(46R) is fixed to the rolling die holder 44 symmetrically to the rotational center axis PO3 of the tool 27 at a fixing angle θ, the higher part of the rolling edge 48B formed on the conical incline 48A rolls on the surface of the steel member 12 and cut into the surface of the steel member 12, and form rolling processing is performed.

Thus, a slip-proof surface 52 which has recessed and projected parts (in this embodiment, as shown in FIG. 10(C), they have almost triangular concentric waved sections, and they have grooves 52B between plural higher parts 52A), they are decided depending on the shape of the rolling edge 48B formed on the conical incline 48A (in this embodiment, having almost triangular waved sections), are formed around the bolt hole 21 in the steel member 12.

In this manner, since the diameter of the higher parts of the edge parts 48C on the conical incline 48A becomes larger from inside to outside, when the tool 27 makes one revolution centering the rotational center axis PO3, a difference by "misshaping" that is given by the inside and the outside edge parts 48C on the slip-proof surface 52 can make to be practically sufficiently small, and thus, plastic working can be performed on the concentric recessed and projected parts on the slip-proof surface 52 with even accuracy and large intensity.

For instance, if plural edge parts 48C are formed on the cylindrical surface of a cylindrical die head in place of the conical incline 48A to form plural concentric recessed and projected parts, the recessed and projected parts are cut by the edge parts that have same radius of curvature: in the above-mentioned case, the radius of curvature of the inside and the outside concentric recessed and projected parts is mutually different. Therefore, a difference by "misshaping" by the corresponding edge parts to the inside and the outside concentric recessed and projected parts becomes large.

According to the aforementioned embodiment, by applying the conical incline 48A, the change of the radius of curvature of the edge parts aligned from inside to outside can be adopted to the change of the radius of curvature of the corresponding concentric recessed and projected parts. Thus, a difference by "misshaping" by the inside and the outside edge parts can make to be small.

The depth of this recessed and projected parts of the slip-proof surface 52 becomes deeper by making plural rotations (about 20 to 30 rotations) the rolling edge 48B by the tool 27 and repeating rolling work by the rolling edge 48B.

In this manner, if the slip-proof surface 52 is finished to be processed around the bolt hole 21 in the steel member 12 by the rolling work by the rolling dies 46L(46R), the spindle device 26 raises the tool 27, and the above processed steel member 12 is put out to the outside via the discharging bench 30.

In the above rolling work, if the surface of the steel member 12 is inclined without coinciding with the reference plane FO of the conical incline 48A on the rolling die 46L(46R), rotation adjusting operation is performed centering the rotary supporting shaft 45A(45B) so that the rolling die holder 44 moves along the surface of the steel member 12, and the inclination of the conical incline 48A is coincided with the inclination of the surface of the steel member 12. Thereby, a pressing force given from the spindle device 26 to the tool 27 will be almost equally given to each edge part 48C of the rolling edge 48B. So that the slip-proof surface 52 has almost even recessed and projected parts over the entire surface. Thus, rolling processing of the slip-proof surface 52 can be performed evenly.

In such rolling work, a pressing force by the conical incline 48A of the rolling die 46L(46R) to the surface of the steel member 12 can be confirmed by eyes by the pressure setting ring 42D and the scale 43A that are provided in the tool body 42, and it can be held to a fixed value that will be decided by the spring force of the coiled spring 42B. Thereby, the form rolling of the higher parts 52A and the grooves 52B that form the slip-proof surface 52 cut on the surface of the steel member 12 can be performed with high and stable accuracy.

(4) Joint of Steel Members

As shown in FIG. 11, the steel member 12 on which the slip-proof surface 52 is formed by the tool 27 in the above manner described with reference to FIGS. 10(A) to 10(C), is clamped by a connecting member such as a bolt or a rivet that passes through the bolt hole 21 in the state where the higher parts 52A of the slip-proof surface 52 is contacted to the connecting surface of the steel member 12 to be joined. And the higher parts 52A of the slip-proof surface 52 are cut into the surface of the steel member 12 to be joined. It increases a frictional force, and slipping on the connecting surface of the steel member 12 can be restrained to a small value.

At the time of this joint work, other than the case where a steel member which does not have the slip-proof surface is used as the steel member 12 to be joined as shown in FIG. 11, a steel member also on which a slip-proof surface similar to the slip-proof surface 52 or another slip-proof surface is formed on the joined surface may be used. Also in this manner, similar effects can be obtained.

(5) Other Embodiments of Joined Surface Processing Tool

The following configurations can be applied as joined surface processing tools 27 other than that described above with reference to FIGS. 8 and 9(A) and 9(B).

(5-1) Plural Coiled Spring Type of Joined Surface Processing Tool

Figure 12:
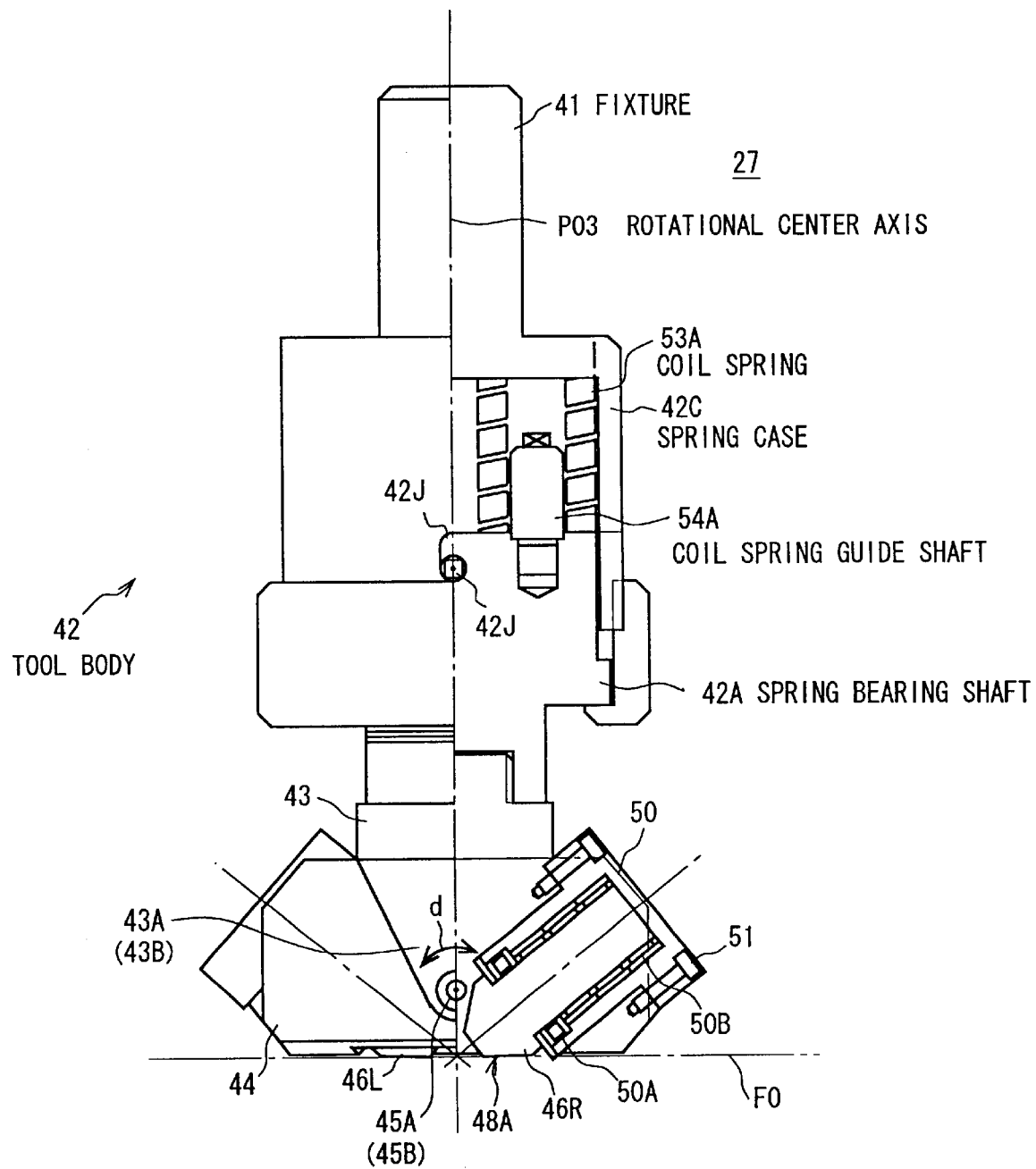
FIG. 12 is a front view showing a part of a plural coiled spring type of a joined surface processing tool as a section.
Figure 13:
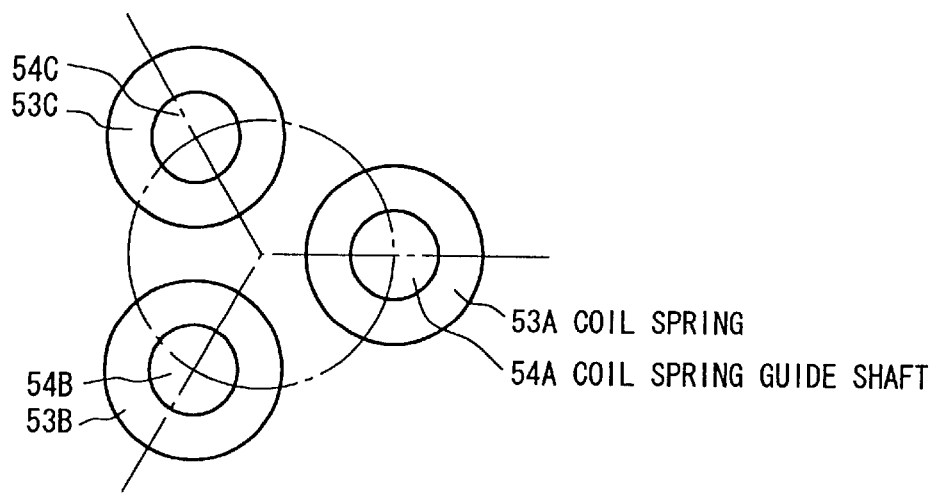
FIG. 13 is a schematic diagram illustrating the arrangement of coil springs in FIG. 12.

FIGS. 12 and 13 show a plural coiled-spring type of a joined surface processing tool 27. In this case, as shown in FIG. 12 in which the same reference numerals are added to corresponding parts in FIG. 8, in the tool 27, a tool body 42 has three coiled springs 53A to 53C as pressure setting members.

In this case, coiled-spring guide shafts 54A to 54C are planted upward at the positions on a spring bearing shaft 42A at regular angular intervals in the direction along a rotational center axis PO3. And the coiled springs 54A to 54C disposed so as to be guided by these coiled-spring guide shafts 54A to 54C transmit a pressing force given to a spring case 42C to the spring bearing shaft 42A.

In the above configuration, the pressing force transmitted to the spring case 42C from a spindle device 26 via a fixture 41 is transmitted to the spring bearing shaft 42A via the three coiled springs 54A to 54C. Thus, a pair of rolling dies 46L and 46R are pressed to the steel member 12 by the pressure corresponding to the spring force of the coiled springs 52A to 52C.

As a result, on the steel member 12, a slip-proof surface 52 which is concentric recessed and projected parts having an almost triangular waved section, cut around a bolt hole 21 by the rolling edges 48C of rolling dies 46L and 46R is formed similarly to the above case described with reference to FIGS. 10(A) to 10(C).

According to the configuration of FIG. 12, the pressing force given by the spring case 42C can be shared by the three coiled springs 52A to 52C. Thus, each coiled spring 53A to 53C can be miniaturized; and a tool 27 which can further simplify to manufacture and adjust coiled springs can be accomplished.

(5-2) Belleville Spring Type of Joined Surface Processing Tool

Figure 14:
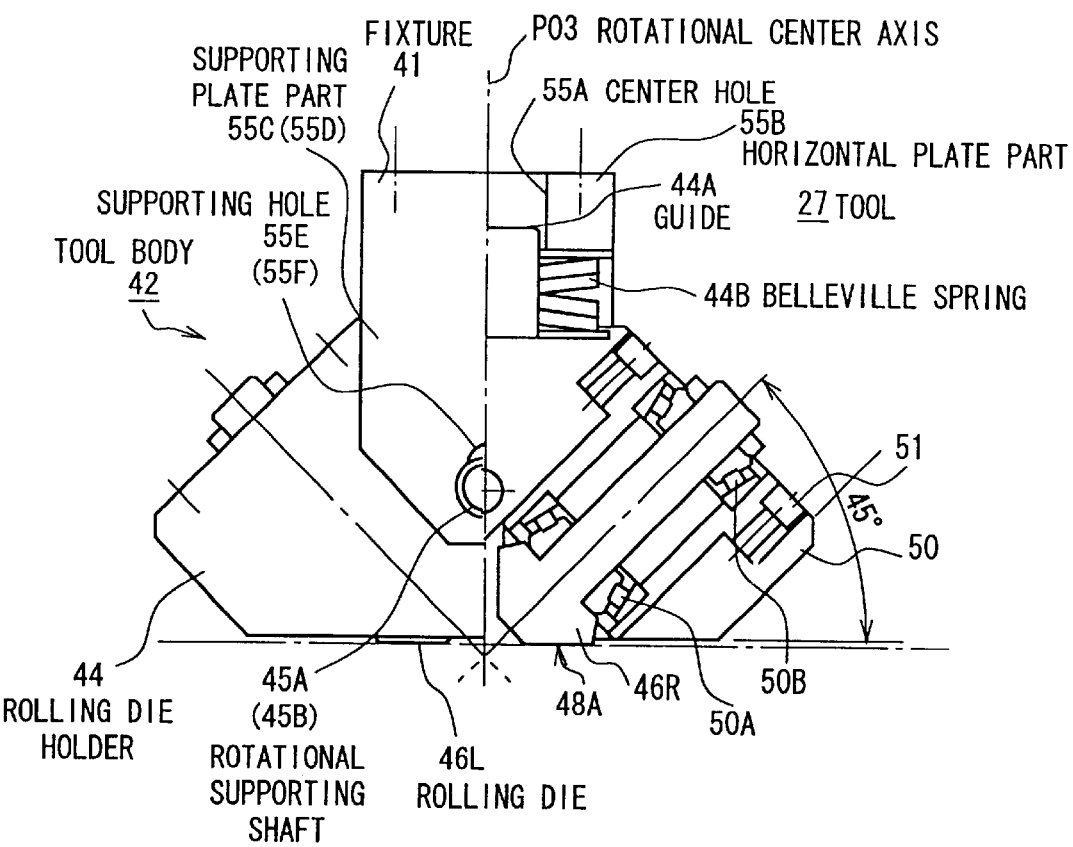
FIG. 14 is a front view showing a part of a belleville spring type of a joined surface processing tool as a section.

FIG. 14 shows a belleville spring type of a joined surface processing tool 27. As shown in FIG. 14 in which the same reference numerals are added to corresponding parts in FIG. 8, the tool 27 has a fixture 41 having a U-shaped section.

The fixture 41 has a horizontal plate part 55B which has a center hole 55A passing through in the vertical direction, at the central part. A pair of supporting plate parts 55C and 55D extend downward almost in parallel from its front and rear ends. Rotary supporting shafts 45A and 45B projecting forward and backward from a rolling die holder 44 are passed through and held by supporting holes 55E and 55F that are oblong holes in the vertical direction respectively provided at its bottom end.

In the case of this embodiment, a member corresponding to the tool supporting member 43 in FIG. 8 is not provided. A guide 44A is planted on the top surface of the rolling die holder 44 along the rotational center axis PO3, and its top end part is directly projected in the center hole 55A of a fixture 41. At the same time, a belleville spring 44B is housed and supported in a space between the top surface of the rolling die holder 44 and the bottom surface of the horizontal plate part 55B around the guide 44A.

In the above configuration, when the tool 27 is not pressed against the steel member 12, the belleville spring 44B presses and expands a distance between the top-surface of the rolling die holder 44 and the bottom surface of the horizontal plate part 55B of the fixture 41 by its spring force. At this time, the rolling die holder 44 becomes into the state where the rotary supporting shafts 45A and 45B contact to the bottom surfaces of the supporting holes 55E and 55F of the supporting plate parts 55C and 55D.

In this state, if the tool 27 is pressed against the surface of the steel member 12 by the spindle device 26, the pressing force is given to the belleville spring 44B from the horizontal plate part 55B of the fixture 41. Thus, the belleville spring 44B performs compressing operation, and the rotary supporting shafts 45A and 45B of the rolling die holder 44 are detached from the bottom surfaces of the supporting holes 55E and 55F and loosely moved. Thereby, the pressing force given to the fixture 41 is applied to the rolling die holder 44, i.e., the conical inclines 48A of the rolling dies 46L and 46R as a pressing force that corresponds to the spring force set to the belleville spring 44B.

According to the above configuration, a slip-proof surface 52 having an almost triangular waved section will be formed by form rolling around the bolt hole 21 on the surface of the steel member 12 by the rolling dies 46L and 46R similarly to the above manner described with reference to FIGS. 10(A) to 10(C).

By applying the belleville spring 44B as a pressure setting element, a tool 27 which when the spindle device 26 is moved down and the rolling dies 46L and 46R are contacted to the steel member 12, form rolling operation can be started to the steel member 12 without giving a large shock (because shock by contacting is absorbed by compressing operation by the belleville spring) can be accomplished.

(5-3) Key Groove Type of Joined Surface Processing Tool

Figure 15:
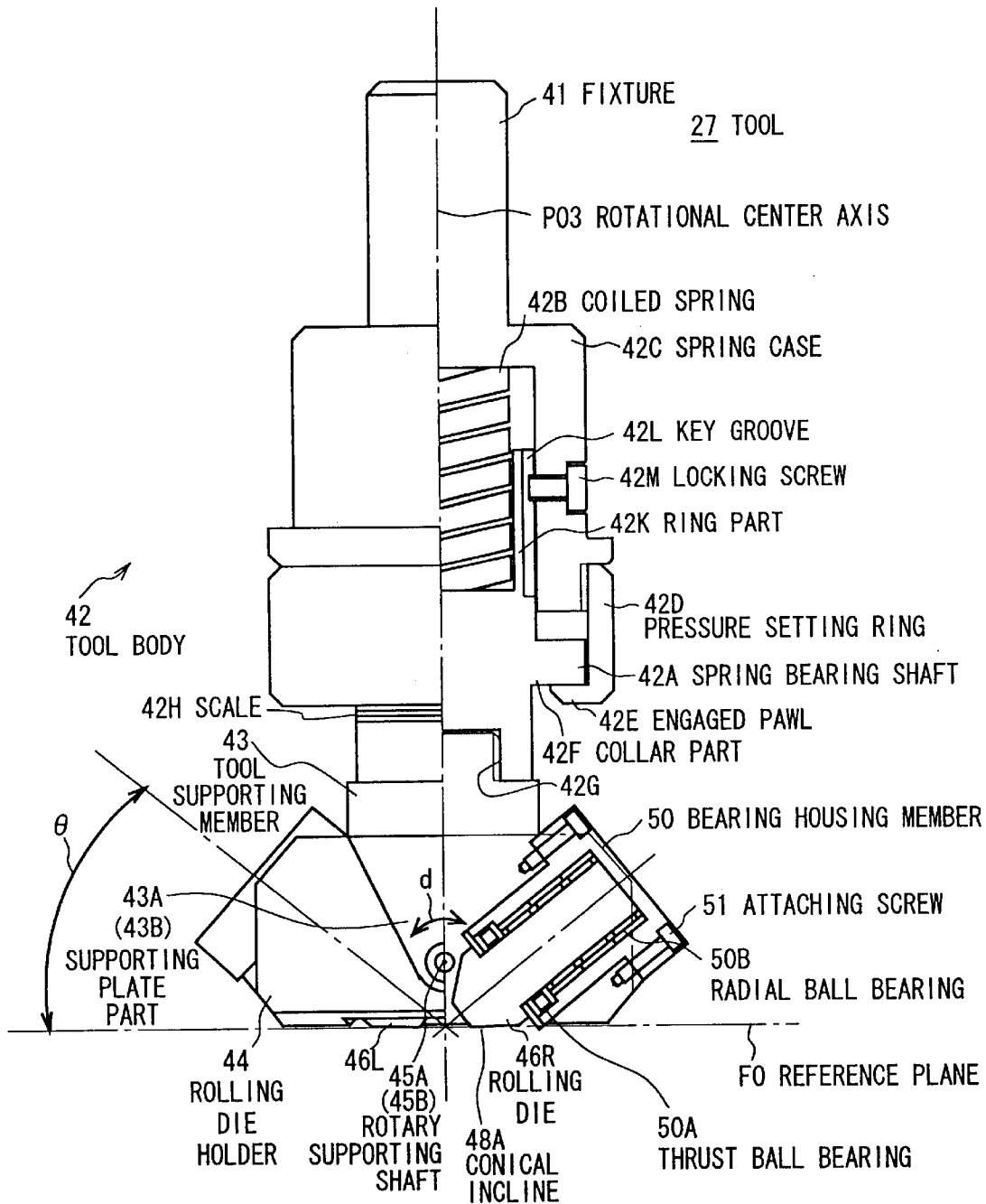
FIG. 15 is a front view showing a part of a key groove type of a joined surface processing tool as a section.

FIG. 15 shows a key groove type of a joined surface processing tool 27. In this case, as shown in FIG. 15 in which the same reference numerals are added to corresponding parts in FIG. 8, the tool 27 is a tool that in the tool 27 of FIG. 8, the rotational torque transmission means composed of the oblong hole 42I and the torque transmission pin 42J engaged with this is replaced to another configuration.

Specifically, a spring bearing shaft 42A has a ring part 42K which extends upward along the outer circumferential surface of a coiled spring 42B on its top outer circumferential part, and a key groove 42L is formed in the vertical direction at the position at the prescribed angle on the outer circumferential surface of the ring part 42K. In the key groove 42L, a locking screw 42M which is screwed from the outside into a screw hole provided so as to pass through the thickness of the spring case 42C is projected and engaged.

According to the above configuration, since the locking screw 42M is engaged with the key groove 42L when the spring case 42C is rotationally driven, the rotational torque given to the spring case 42C is transmitted to the spring bearing shaft 42A via the locking screw 42M and the key groove 42L. Thus, the locking screw 42M and the key groove 42L form rotational torque transmission means.

In this case, if a screwed amount of the pressure setting ring 42D to the spring case 42C is changed and a relative position of the spring case 42C to the spring bearing shaft 42A is changed, the engaged position of the locking screw 42M with the key groove 42L is shifted in the vertical direction, so that adjustment by the above pressure setting ring 42D is permitted.

According to the above configuration, a tool having similar effects to the tool 27 having the configuration of FIG. 8 can be accomplished.

(6) Joint by In-Raw System (6-1) FIGS. 16 and 17 show a method of joining steel members by an in-raw system. Form rolling processing shown in FIGS. 16(A) to 16(C) (in a similar manner to the processing described above with reference to FIGS. 10(A) to 10(C)) can be performed using the tools described above with reference to FIGS. 8, 12, 14 and 15 as rolling dies 46L and 46R, and obtaining a first steel member 12 on which a slip-proof surface 52 having an almost triangular waved section has cut.

Additionally, in the case of this joining method, as shown in FIG. 17(A), form rolling is performed on a second steel member 12X using rolling dies 46LX and 46RX that the higher parts and recessed parts having the almost triangular waved sections on the conical incline 48A are replaced. Thus,.as shown in FIGS. 17(B) and 17(C), a second steel member 12X on which a slip-proof surface 52X in which the positions of higher parts 52A and groove parts 52B are inverted to the first steel member 12 (FIGS. 16(B) and 16(C)) as going outward in the width direction has cut centering the bolt hole 21 can be obtained.

Figure 18:
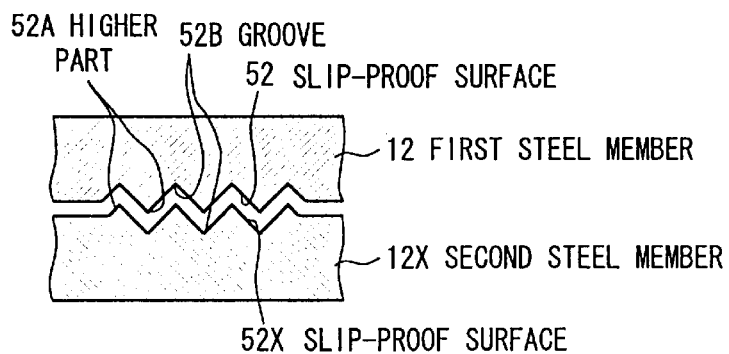
FIG. 18 is a sectional view showing a joint of the slip-proof surfaces 52 and 52X by an in-raw system.

In this manner, as shown in FIG. 18, the first steel member 12 subjected to the form rolling by the tool 27 that has the first rolling dies 46L and 46R and the second steel member 12X obtained by the form rolling by the tool 27 that has the second rolling dies 46LX and 46RX have the recessed and projected forms that are engaged so that the higher parts 52A and the grooves 52B are mutually fitted. Accordingly, if the first and the second steel members 12 and 12X are clamped by a bolt so that the slip-proof surfaces 52 and 52X are mutually opposite centering the bolt hole 21, they can be joined in the state where the higher parts 52A of the slip-proof surface 52 on one steel member 12 are just fitted into the grooves 52B of the slip-proof surface 52X on the other second steel member 12X and also the higher parts 52A of the slip-proof surface 52X on the other second steel member 12X are just fitted into the grooves 52B of the slip-proof surface 52 on the above one steel member 12 (this joining method is referred to as joining method by the in-raw system).

As the above, when the two steel members 12 and 12X are joined, if they are joined by the in-raw system that with respect to the slip-proof surfaces on each steel member, the higher parts (or grooves) on one steel member are engaged with the grooves (or higher parts) on the other steel member so as to just fit, deviation on the joined surface of the two steel members can be sufficiently prevented. Therefore, firm joining of the steel members can be realized.

Figure 19:
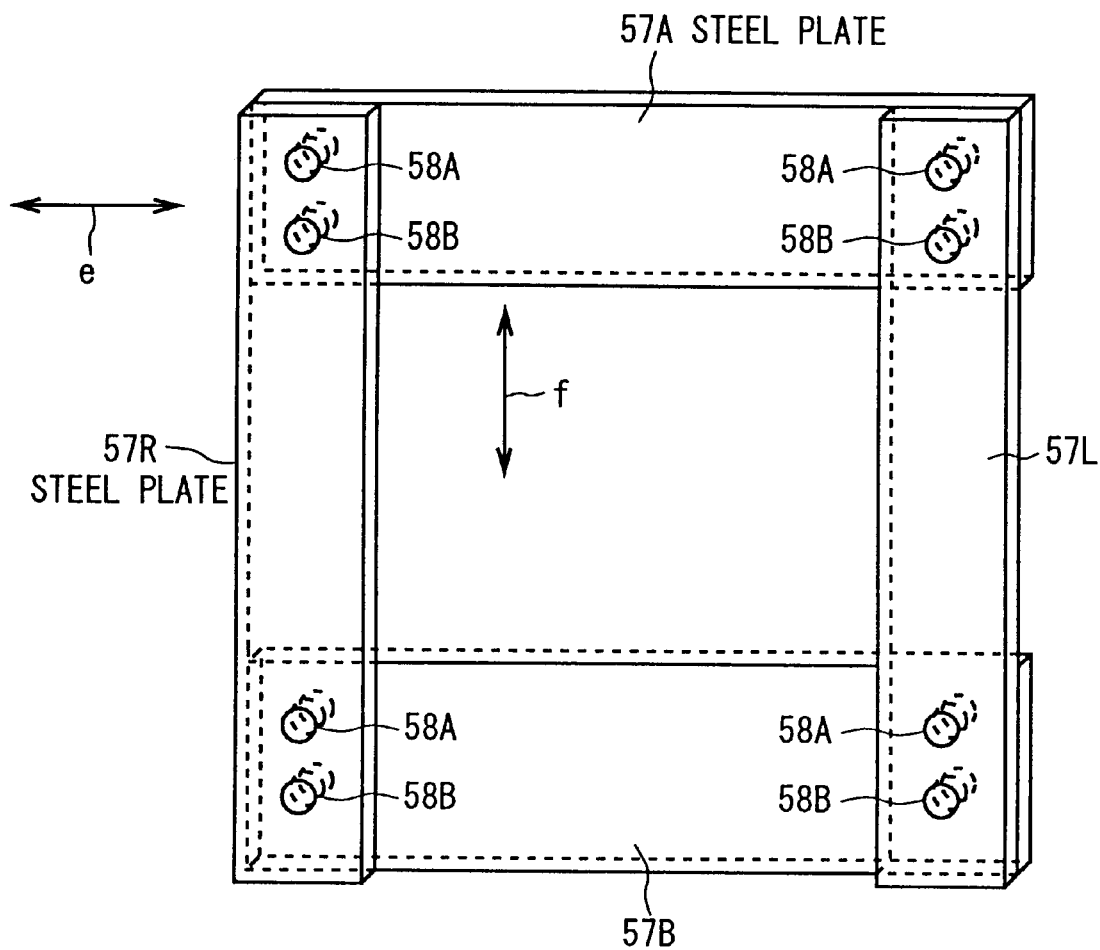
FIG. 19 is a perspective view illustrating a frame structure assembled by joining steel plates.
Figure 20:
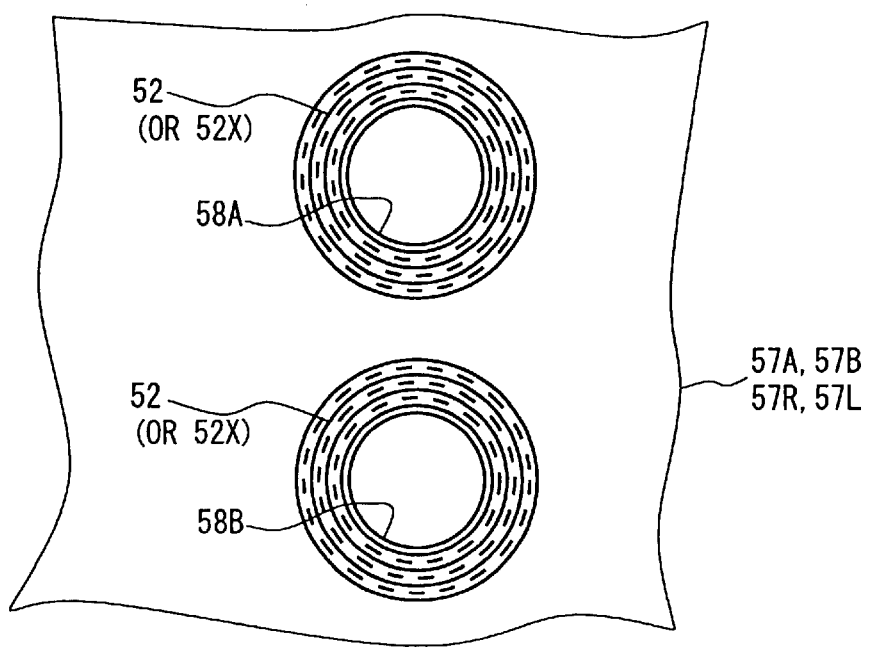
FIG. 20 is a fragmentary enlarged view explaining a joined part of the steel plates of FIG. 19.

(6-2) As a concrete example of joining by the in-raw system, as shown in FIG. 19, two pieces of steel plates 57A and 57B which extend in the horizontal direction and disposed almost in parallel at the vertical positions are joined by two pieces of steel plates 57R and 57L that are disposed in the vertical direction at the both ends and mutually almost in parallel, and assembling a square frame structure. In this case, when the ends of two pieces of steel plates mutually overlapped at the four corners are joined by cramping by a bolt passing through two bolt holes 58A and 58B that have drilled in the steel plates so as to penetrate the thickness, a slip-proof surface 52 or 52X shown in FIG. 20 is cut onto the joined surface of the two pieces of steel plates, and then the two pieces of steel plates are clamped by the bolt passing through the bolt holes 58A and 58B in the state where the above slip-proof surfaces 52 and 52X are mutually engaged by the in-raw system so as to fit.

At this time, since the slip-proof surfaces 52 and 52X that have the recessed and projected parts having the almost triangular concentric waved section around the bolt holes 58A and 58B are clamped as fitting, if the two pieces of steel members are about to be mutually shifted on the joined surfaces, the function that shifting of the two steel plates is prevented since the higher parts 52A of each slip-proof surface 52 and 52X are engaged with the grooves 52B of the other as fitting can be obtained.

This force to prevent face shifting functions in the all directions of the width direction from the bolt holes 58A or 58B since the slip-proof surfaces 52 and 52X are formed by the concentric recessed and projected parts having the higher parts 52A and the grooves 52B. Accordingly, in the frame structure of FIG. 19, also in the case where a force to shift in the horizontal direction functions to the frame structure as shown by an arrow "e" and the case where a vertical force functions to the frame structure as shown by an arrow "f", the motion that the two pieces of steel plates shift can be prevented owing to the slip-proof surfaces 52 and 52X that are engaged as mutually-fitting by the in-raw system.

Thus, giving a shearing force to the bolt passing through the bolt holes 58A and 58B can be prevented, so that a frame structure in which steel plates are firmly joined as a whole can be constructed.

(6-3) FIGS. 21(A) to 21(C) Show a Joining Method by a Tie Rod 60.

The tie rod 60 is parts in which two pieces of rods being rods of steel member will be joined so that it can be used as one piece of rod. Plate parts 60C and 60D are respectively formed at the top of rod parts 60A and 60B. In the state where the surfaces of the above plate parts 60C and 60D are sandwiched in by two pieces of washers 60E and 60F, the both ends of the washers 60E and 60F are clamped by a bolt 60G and a nut 60H and a bolt 60I and a nut 60J, to mutually join the plate parts 60C and 60D.

In this manner, the two pieces of rod parts 60A and 60B are mutually joined via the washers 60E and 60F, and it can be used as one piece of rod as a whole.

In case of this joining method, on the both sides of the plate parts 60C and 60D, a slip-proof surface 52 has cut around bolt holes 60K and 60L similarly to the slip-proof surface 52 described above with reference to FIGS. 16(A) to 16(C). On the other hand, on the inner surfaces of the two pieces of washers 60E and 60F, slip-proof surfaces 52X having a structure engaged with the slip-proof surface 52 has cut around the bolt holes 60K and 60L that correspond to the bolts 60G and 60I in a similar manner to the above described with reference to FIGS. 17(A) to 17(C).

In the configuration of FIGS. 21(A) to 21(C), the tie rod 60 is clamped by the bolts 60G and 60I in the state where the slip-proof surface 52X respectively formed on the inside surfaces of the washers 60E and 60F are engaged with the slip-proof surfaces 52 formed on the both sides of the plate parts 60C and 60D formed at the top end of the rod parts 60A and 60B as fitting by the in-raw system.

In this state, if the rod parts 60A and 60B are pulled in the directions shown by arrows "g" (FIG. 21(B)), the higher parts 52A and the grooves 52B of the slip-proof surfaces 52 and 52X are mutually engaged, and face shifting of the plate parts 60C and 60D to the washers 60E and 60F can be prevented. Thus, fear of shearing of the bolts 60G and 60I can be further reduced.

Figure 22A:
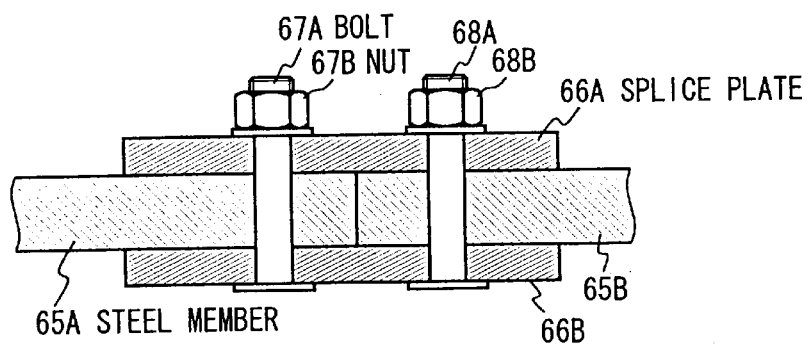
FIGS. 22(A) to 22(D) are sectional views and plan views explaining a joint method in which steel members 65A and 65B are joined by splice plates 66A and 66B.

(6-4) FIGS. 22(A) to 22(D) show a joining method of joining steel members having almost the same thickness by splice plates. As shown in FIG. 22(A), in the state where two steel members 65A and 65B of which the thickness are almost equal are mutually butted, splice plates 66A and 66B being a pair of joining members are overlapped in sandwich on the butt ends of the steel members 65A and 65B, and they are joined by a bolt 67A and a nut 67B and a bolt 68A and a nut 68B respectively.

Figure 22B:
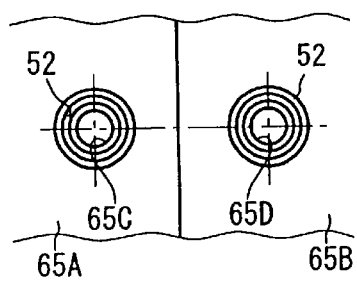
Figure 22C:
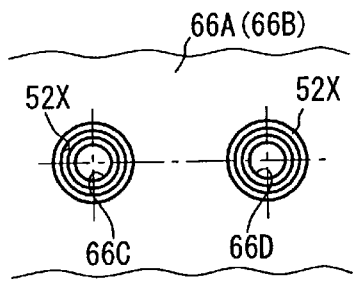

In this case, as shown in FIG. 22(B), a slip-proof surface 52 described above with reference to FIGS. 16(A) to 16(C) has cut around bolt holes 65C and 65D on the both sides of the steel members 65A and 65B, on the other hand, as shown in FIG. 22(C), a slip-proof surface 52X described above with reference to FIGS. 17(A) to 17(C) has cut around bolt holes 66C and 66D on the inside surfaces of the splice plates 66A and 66B as recessed and projected parts that can be fitted into the slip-proof surface 52 by the in-raw system.

Figure 22D:
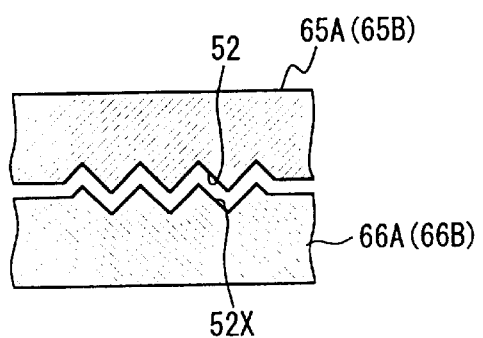

Thus, as shown in FIG. 22(D), if the butt ends of the steel members 65A and 65B are clamped by the bolts 67A and 68A by means of the splice plates 66A and 66B, on the joined surfaces of the steel member 65A and the splice plates 66A and 66B and the steel member 65B and the splice plates 66A and 66B, the friction-processed surfaces 52 and 52X are mutually fitted by the in-raw system.

According to the above configuration, if the steel members 65A and 65B mutually butted are pulled in the direction mutually separating or pressed in the direction mutually shifting aside, since the higher parts 52A and the grooves 52B of the slip-proof surfaces 52 and 52X are mutually engaged, stress to the above tensile force and pressing force is generated. Therefore, the fear that the steel members 65A and 65B are separated or shifted can be effectively prevented.

Thus, the steel members 65A and 65B can be firmly joined by the splice plates 66A and 66B.

Figure 23A:
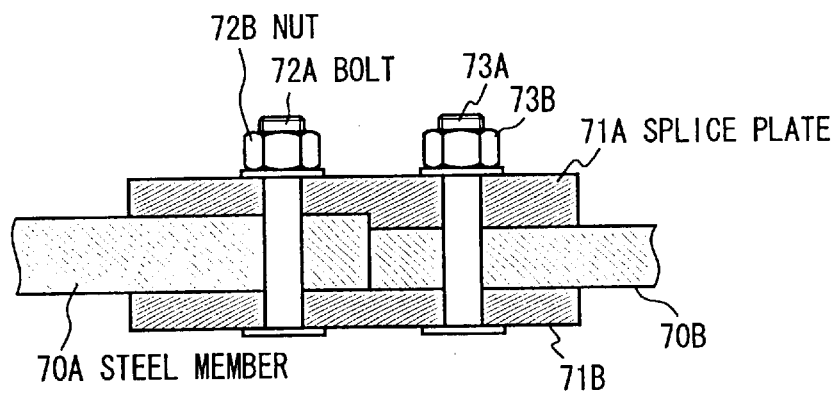
FIGS. 23(A) to 23(E) are sectional views and plan views explaining a joint method in which steel members 70A and 70B different in thickness are joined by splice plates 71A and 72B.

(6-5) FIGS. 23(A) to 23(E) show a joining method of joining steel members having different thickness by splice plates. In this case, as shown in FIG. 23(A), in the state where two steel members 70A and 70B having different thickness are mutually butted and splice plates 71A and 71B being two pieces of joining members are sandwiched, steel plates 70A and 70B are respectively clamped by a bolt 72A and a nut 72B and a bolt 73A and a nut 73B.

Figure 23B:
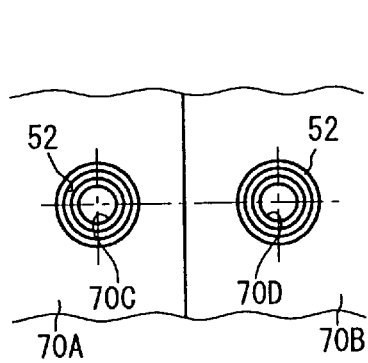

In this case, as shown in FIG. 23(B), on the both ends of the butt ends of the steel members 70A and 70B, a slip-proof surface 52 has cut around bolt holes 70C and 70D in a similar manner to the above described with reference to FIGS. 16(A) to 16(C).

Figure 23C:
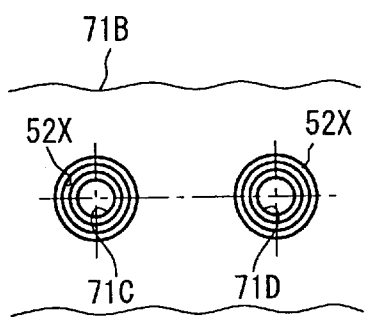

On the inside surface of the underside splice plate 71B, as shown in FIG. 23(C), the both faces which contact to the thick steel member 70A and the thin steel member 70B are formed in flat and in the same height. On the above flat inside surface, a slip-proof surface 52X has cut around bolt holes 71C and 71D that correspond to the bolts 72A and 73A similarly to the above described with reference to FIGS. 17(A) to 17(C).

Figure 23D:
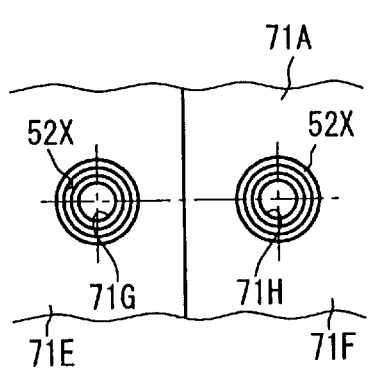

On the other hand, on the inside surface of the upside splice plate 71A, as shown in FIG. 23(D), a low inside surface part 71E which contacts to the thick steel member 70A and a high second inside surface part 71F which contacts to the butt end of the thin steel member 70B are formed.

A slip-proof surface 52X is formed around a bolt hole 71G in the first low inside surface part 71E that corresponds to the bolt 72A similarly to the above described with reference to FIGS. 17(A) to 17(C), and also a slip-proof surface 52X has cut around a bolt hole 71H in the second high inside surface part 71F that corresponds to the bolt 73A similarly to the above described with reference to FIGS. 17(A) to 17(C).

Thus, the thick steel member 70A is put in the state where its both sides are leaving no space between the flat plane of the splice plate 71B and the first low inside surface part 71E of the splice plate 71A. And the thin steel member 70B is put in the state where its both sides are leaving no space between the flat plane of the splice plate 71B and the second high inside surface part 71F of the splice plate 71A.

Figure 23E:
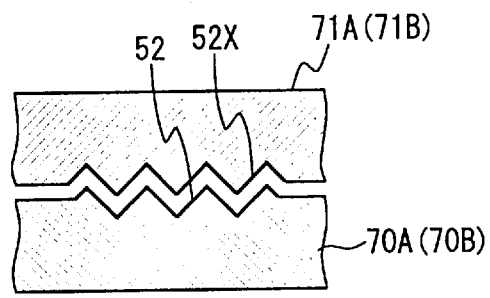

As a result, by clamping the butt ends of the two steel members 70A and 70B that are different in thickness by the bolts 72A and 73A via the two pieces of splice plates 71A and 71B, as shown in FIG. 23(E), the slip-proof surfaces 52 and 52X formed around the bolt holes of the bolts 72A and 73A can be joined as mutually fitted by the in-raw system. Thus, if the steel members 70A and 70B are pulled in the direction mutually separating or pressed in the direction to shift aside, the higher parts 52A and the grooves 52B of the above slip-proof surfaces 52 and 52X are mutually engaged, and large stress is generated to the above tensile force or a pressing force in the shifting direction.

In this manner, the two steel members 70A and 70B different in thickness can prevent the occurrence of phenomena to mutually separate or shift aside to the tensile force or the force to shift aside by the engagement of the slip-proof surfaces 52 and 52X. Therefore, the two steel members 70A and 70B that are different in thickness can be firmly joined by the two pieces of splice plates 71A and 71B.

When cutting the slip-proof surfaces 52 and 52X on the steel members 70A and 70B and the splice plates 71A and 71B, by using the joined surface processing tools 27 described above with reference to FIGS. 8, 12, 14 and 15, the processing of the slip-proof surface 52X can be easily conducted onto narrow areas around bolt holes on the first and the second inside surface parts 71E and 71F of the splice plate 71A that have different heights to correspond to the difference in thickness of the steel members 70A and 70B, and the flat plane of the splice plate 71B respectively.

Figure 24:
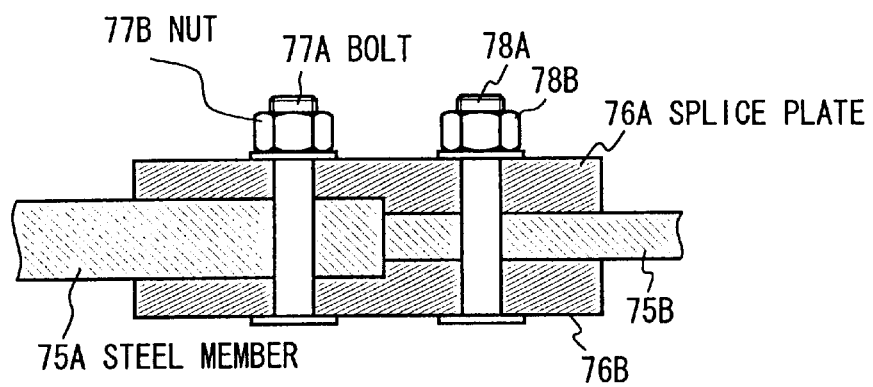
FIGS. 24(A) to 24(E) are sectional views and plan views explaining a joint method in which steel members 75A and 75B different in thickness are joined by splice plates 76A and 76B.
Figure 24:
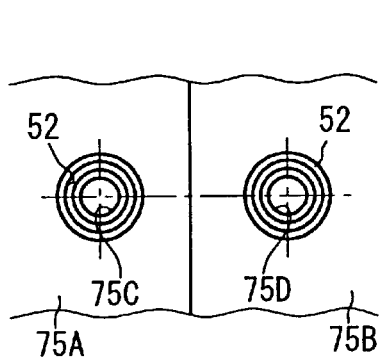
Figure 24:
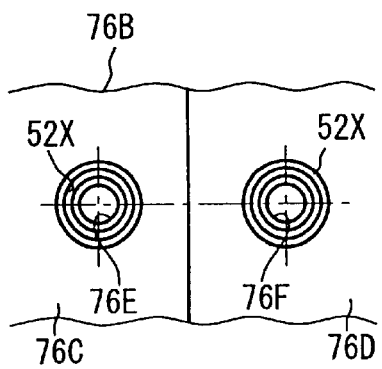
Figure 24:
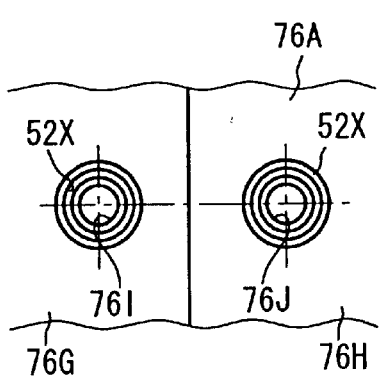
Figure 24:
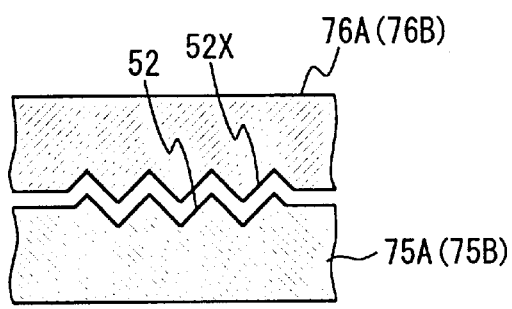
Figure 25:
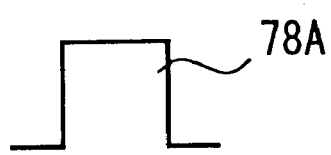
FIGS. 25(A) to 25(E) are schematic diagrams illustrating the projected shapes of slip-proof surfaces.
Figure 25:
Figure 25:
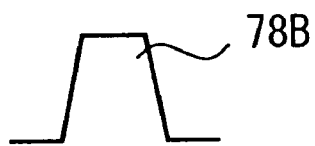
Figure 25:
Figure 25:

(6-6) FIGS. 24(A) to 24(E) show a joining method when steel members different in thickness are joined by splice plates. As shown in FIG. 24(A), splice plates 76A and 76B as two pieces of joining members are overlapped in sandwich on a thick steel member 75A and a thin steel member 75B, and they are clamped by a bolt 77A and a nut 77B and a bolt 78A and a nut 78B.

In this case, on the both sides of the butt ends of the thick steel member 75A and the thin steel member 75B, as shown in FIG. 24(B), a slip-proof surface 52 has cut around the bolt holes 75C and 75D of the bolts 77A and 78A similarly to the above described with reference to FIGS. 16(A) to 16(C).

On the inside surface of the underside splice plate 76B, as shown in FIG. 24(C), a first low inside surface part 76C which contacts to the thick steel member 75A and a second high inside surface part 76D which contacts to the thin steel member 75B are formed.

In the low inside surface part 76C and the high inside surface part 76D, a slip-proof surface 52X has cut around the bolt hole 76E of the bolt 77A and the bolt hole 76F of the bolt 78A respectively, similarly to the above described with reference to FIGS. 17(A) to 17(C).

Similar to that, on the upside splice plate 76A, as shown in FIG. 24(D), a first low inside surface part 76G which contacts to the thick steel member 75A and a high inside surface part 76H which contacts to the thin steel member 75B are formed.

In the low inside surface part 76G and the high part 76H, slip-proof surfaces 52X have cut around the bolt hole 76I of the bolt 78A and the bolt hole 76J of the bolt 78B similarly to the above described with reference to FIGS. 17(A) to 17(C).

Therefore, the inside surface parts 76C and 76G at which the splice plates 76A and 76B are low can be contacted to the thick steel member 75A with no space, and the inside surface parts 76D and 76H at which the splice plates 76A and 76B are high can be contacted to the thin steel member 75B with no space.

Thus, as shown in FIG. 24(E), the slip-proof surface 52X formed on the low inside surface parts 76C and 76G is engaged with the slip-proof surface 52 formed on the both sides of the thick steel member 75A so as to fit by the in-raw system, and at the same time, the slip-proof surface 52X formed on the high inside surface parts 76D and 76H is engaged with the slip-proof surface 52 formed on the both sides of the thin steel member 75B as fitting by the in-raw system.

According to the above configuration, if the two steel members 75A and 75B which are different in thickness are pulled in the separating direction or pressed in the direction to mutually shift aside, the higher parts and the grooves of the slip-proof surfaces 52 and 52X are mutually engaged, and large stress is generated to the above tensile force or pressing force.

As a result, the two steel members 75A and 75B are firmly joined by the two pieces of splice plates 76A and 76B.

In this connection, as a method of joining two steel members having a different thickness in sandwich, heretofore, when there is a space of 1 [mm] or more, it has been applied that after the processing to cut the steel member having a thickness for the space the above processed surface is brought to be rusty and then they are joined, or an iron plate for the space is newly put in and then they are joined. According to the embodiments of FIGS. 24(A) to 24(E) (it is similar also in case of FIGS. 23(A) to 23(E)), the two steel members having different thickness can be firmly joined without such troublesome processing only by performing the simple form rolling processing on the face parts of splice plates having a difference in level by means of the joined surface processing tool 27 described above with reference to FIGS. 8, 12, 14 and 15.

(7) Other Embodiments (7-1) In the above embodiment, it has dealt with the case where the slip-proof surfaces 52 and 52X are formed on steel members in which a bolt hole has previously drilled. In place of this, however, the same effect as the aforementioned embodiment can be obtained if the form rolling processing of the slip-proof surfaces 52 and 52X is performed around the predetermined positions to drill a bolt hole in a steel member having no bolt hole, and then the bolt hole is drilled or the bolt hole is drilled at the same time as the form rolling processing of the slip-proof surfaces 52 and 52X.

(7-2) In the aforementioned embodiment, it has dealt with the case where bolts are applied as members to join steel members. However, the present invention is not only limited to this but also similarly can be applied to the case where other joining members such as rivets or the like are used as joining members.

(7-3) In the aforementioned embodiment, it has dealt with the case where the attaching angle $\theta$ of the rolling die 46L(46R) (FIG. 8) is set to $\theta=40°$ as a suitable condition when a ball bearing is used. However, the attaching angle $\theta$ is not only limited to this but also various angles can be selected.

In this connection, when the attaching angle θ is θ=40°, form rolling processing with less "misshaping" can be practically performed with respect to the entire conical inclines 48A and 48B. On the other hand, if it becomes θ≈0°, "misshaping" at an external diameter part tends to become large. If θ becomes larger than 45°, the breadth of the joined surface processing tool 27 can be reduced.

(7-4) In the aforementioned case, it has dealt with the case where the spindle device 26 in which the tool 27 is moved up and down via the tool body 42 having the pressure setting means by connecting the output shaft of the hydraulic pump to the up/down mechanism is applied as a processing mechanism part 25. However, the same effect as the above embodiment can be obtained also if the output shaft of an electric motor is connected to the up/down mechanism part via a gear mechanism.

In this case, a driving source having a simple structure and the structure of an electric motor in which the down viscosity is lower than the hydraulic pump can be applied. Thereby, a joined surface processing apparatus 11 can be remarkably miniaturized and reduced in weight. Thus, a portable joined surface processing apparatus 11 which can perform processing to a steel member 12 at a construction site other than plants can be accomplished.

(7-5) In the aforementioned embodiment, it has dealt with the case where coil springs and belleville springs are applied as the pressure setting means. However, the same effect as the above embodiment can be obtained also if a hydraulic adjustment mechanism or a pneumatic adjustment mechanism is applied in place of that.

(7-6) In the aforementioned embodiment, it has dealt with the case where plural concentric recessed and projected parts are formed as the slip-proof surfaces 52 and 52X. However, as shown in FIGS. 25(A) to 25(E), the same effect as the above embodiment can be obtained also if forming one or plural recessed and projected parts (having at least one higher part 52) in various shapes such as a quadrilateral form 78A, a trapezoidal form 78B, a triangular form 78C, a pentagonal form 78D, a semielliptical form 78E, etc., in place of that.

(7-7) In the aforementioned embodiment, it has dealt with the case where the slip-proof surfaces 52 and 52X are concentrically formed around the bolt holes 21 and 21X. However, in place of this, they may be formed at positions other than the bolt holes 21 and 21X or positions which are not concentrical with the bolt holes 21 and 21X.

[2] Second Embodiment (1) Strut Reinforcing Member

Figure 1:
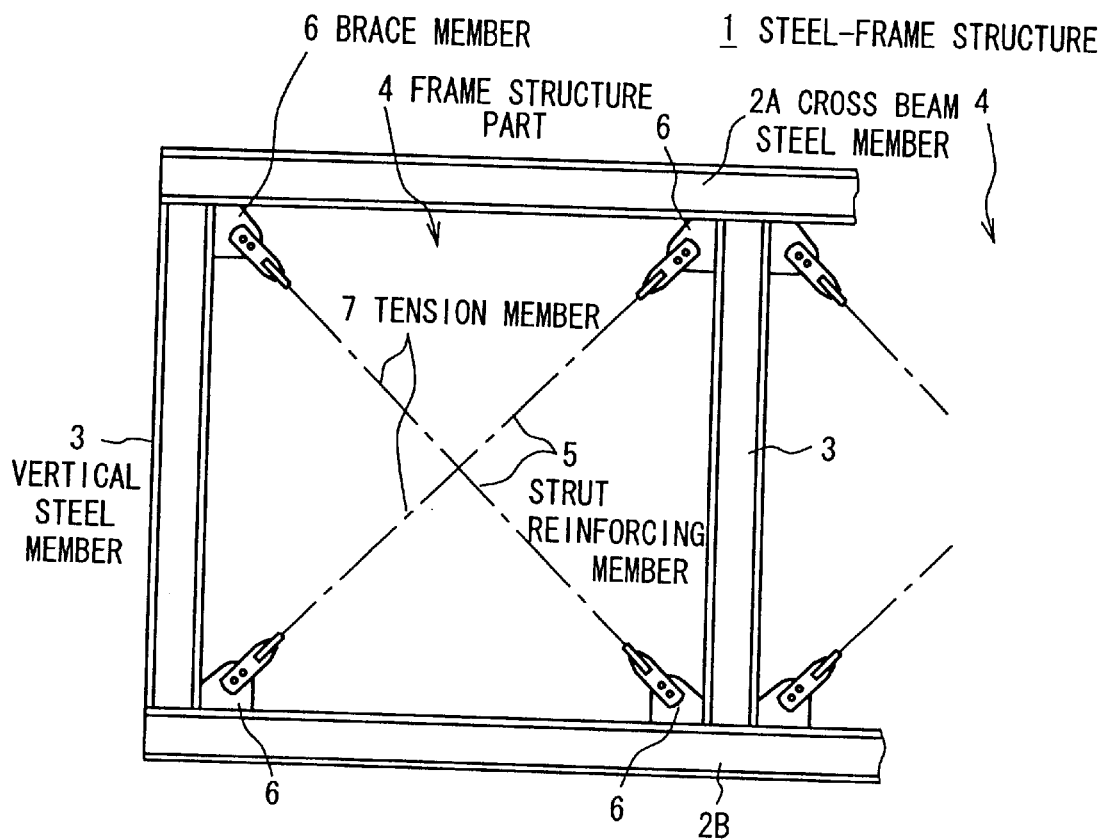
FIG. 1 is a front view showing a conventional steel-frame structure.
Figure 2:
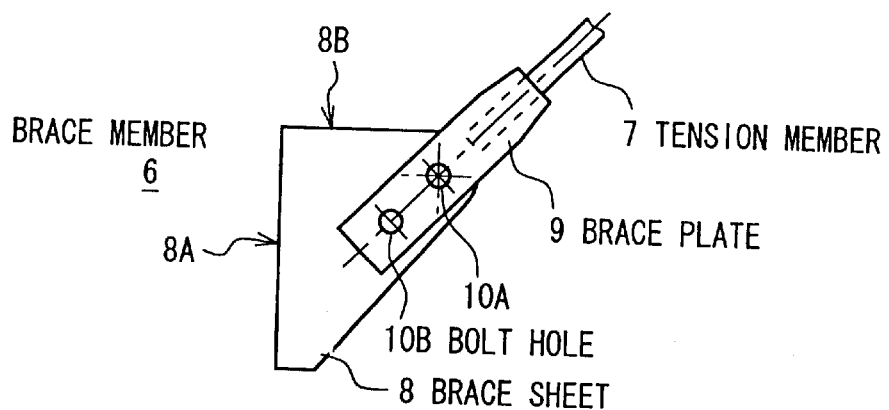
FIG. 2 is a front view showing a brace member 6 in FIG. 1.
Figure 26:
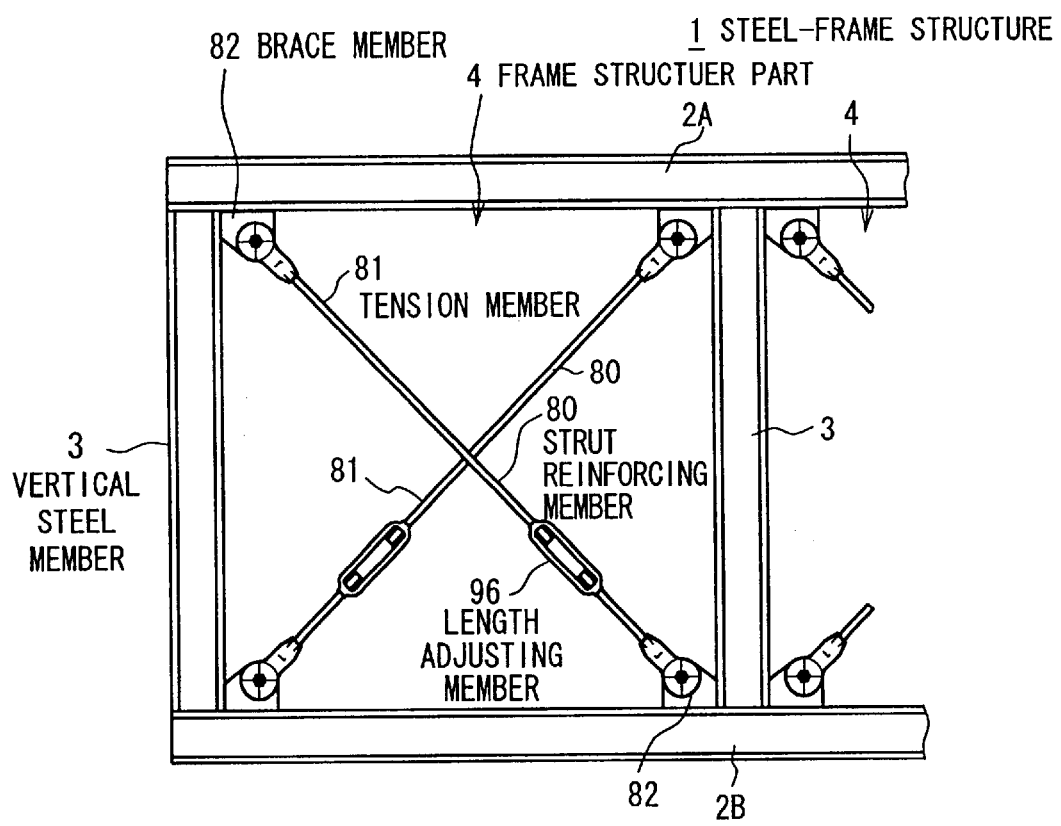
FIG. 26 is a front view showing a steel-frame structure applying the reinforcing member according to the present invention.

FIG. 26 in which the same reference numerals are added to corresponding parts in FIG. 1 shows a steel-frame structure 1 in which the quake-proof ability is further improved. In each frame structure part 4 of the steel-frame structure 1, two pieces of strut reinforcing members 80 are fixed to between the opposite corners.

Referring to FIG. 26, in the steel-frame structure 1, plural vertical steel members 3 are fixed at prescribed intervals to between a pair of cross beam steel members 2A and 2B that-are mutually in parallel, and the both ends of the vertical steel member 3 is fixed to the cross beam steel members 2A and 2B. Plural frame structure parts 4 are sequentially formed in array in the direction extending the cross beam steel members 2A and 2B.

In the strut reinforcing members 80, the both ends of tension members 81 being sticks of steel members are connected to the opposite corners of the frame structure part 4 via brace members 82.

Figure 27:
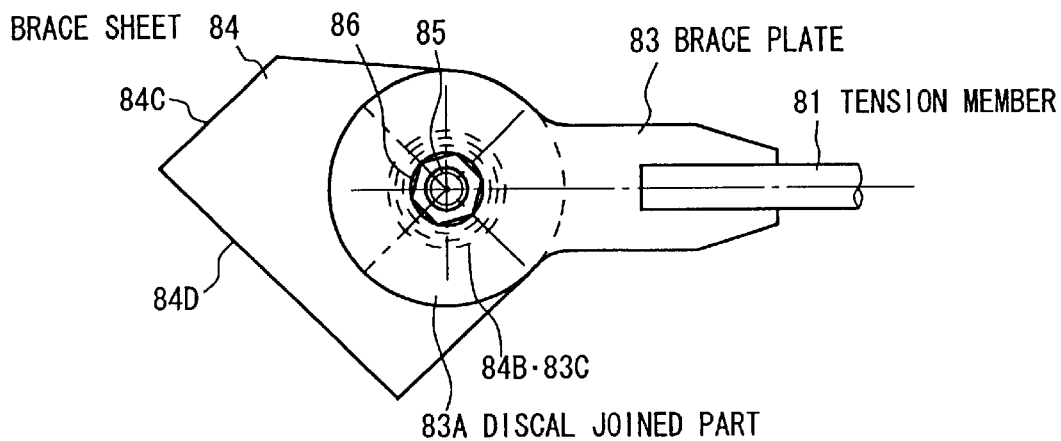
FIG. 27 is a plan view illustrating a brace member 82 in FIG. 26.
Figure 28:
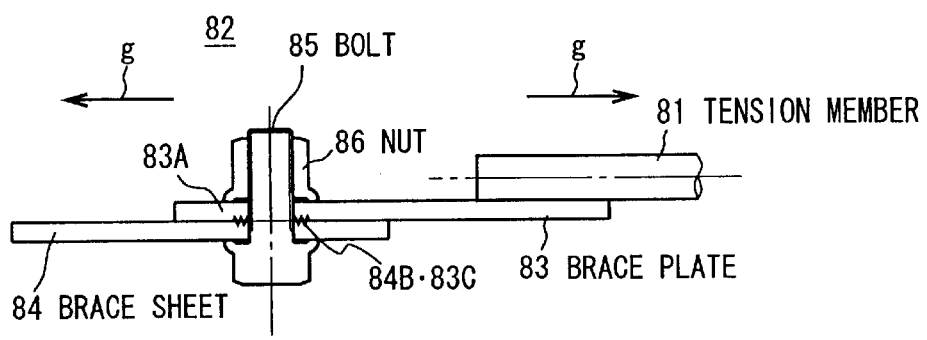
FIG. 28 is a side sectional view of FIG. 27.

As shown in FIGS. 27 and 28, the brace member 82 has a structure joined in one body by clamping with a bolt 85 and a nut 86 in the state where a discal joined part 83A formed at the end of a brace plate 83 is overlapped on a brace sheet 84.

Figure 29:
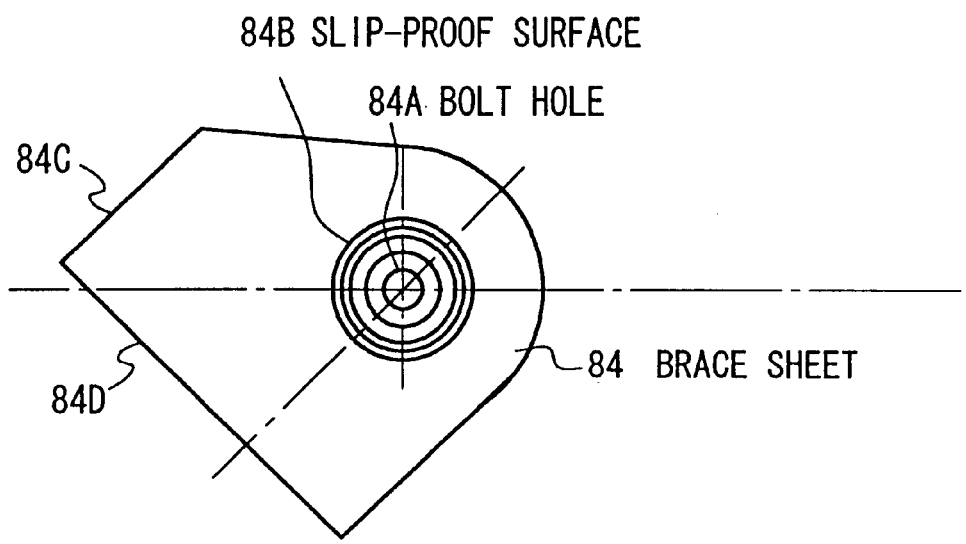
FIG. 29 is a plan view illustrating a brace sheet 84 in FIG. 27.

As shown in FIG. 29, on the surface that is contacted to the brace plate 83 of the brace sheet 84, a slip-proof surface 84B which has concentrical recessed and projected parts has been formed around a bolt hole 84A.

Figure 30:
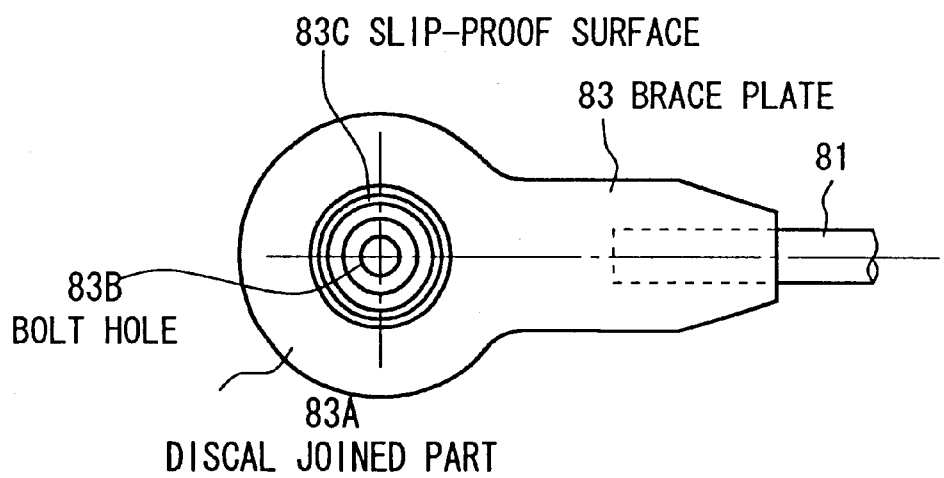
FIG. 30 is a plan view illustrating a brace plate 83 in FIG. 27.
Figure 31:
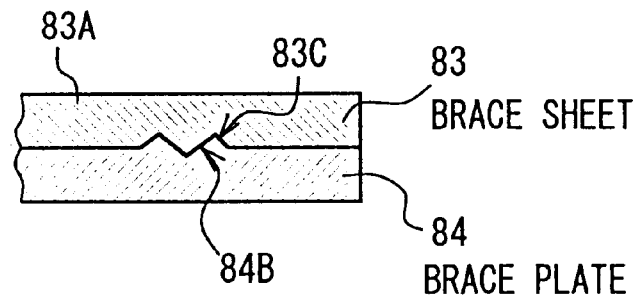
FIG. 31 is a sectional view explaining fitting by an in-raw system.

On the other hand, as shown in FIG. 30, on the surface that is contacted to the brace sheet 84 of the discal joined part 83A of the brace plate 83, a slip-proof surface 83C which has concentrical recessed and projected parts has been formed around a bolt hole 83B. As shown in FIG. 31, when the discal joined part 83A is overlapped on the brace sheet 84, they can be joined in the state where the recessed and projected surface of the slip-proof surface 84B on the brace sheet 84 is just fitted to the recessed and projected surface of the slip-proof surface 83C on the discal joined part 83A.

In case of this embodiment, the slip-proof surface 84B on the brace sheet 84 and the slip-proof surface 83C on the brace plate 83 will be respectively formed by form rolling processing with rolling tools TO1 and TO2 shown in FIGS. 32(A) and 32(B).

As shown in FIG. 32(A), the rolling tool TO1 which has been located to the brace sheet 84 so that a revolving center shaft PO1 passes through the center point of the bolt hole 84A in the brace sheet 84, makes form rolling while pressing a pair of rolling dies 87L and 87R against the brace sheet 24 with a large load centering the revolving center shaft PO1.

Figures 34A, 34B:
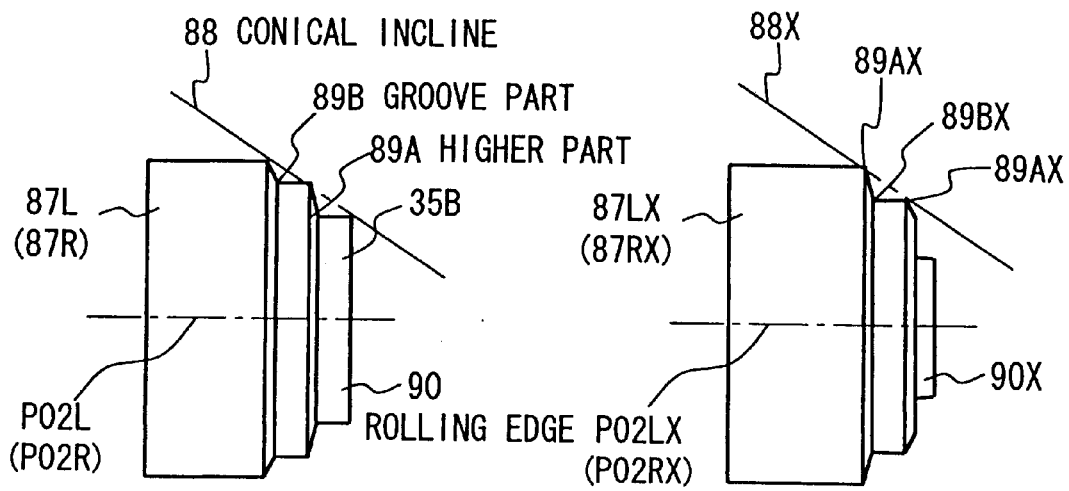

As shown in FIG. 34(A), at the top end, the rolling dies 87L and 87R have a rolling edge 90 which has one ring higher part 89A and two ring groove parts 89B at both sides of 89A on a conical incline 88. The rolling dies 87L and 87R are held by die holders (not shown) so that their revolving center shafts PO2L and PO2R are symmetrically located to the revolving center shaft PO1 at a predetermined angle. So that the higher part 89A and the groove parts 89B can be pressed in the state where the conical incline 88 is extended so as to be just along the surface of the brace sheet 84.

Thereby, if the rolling tool TO1 is revolved centering the revolving center shaft PO1, the rolling edges 90 of the rolling dies 87L and 87R make form rolling as biting the periphery of the bolt hole 84A in the brace sheet 84; recessed and projected parts which have almost the same shape as the surface of their higher part 89A and the groove parts 89B are formed around the bolt hole 84A.

Thus, as shown in FIGS. 32(B) and 32(C), the slip-proof surface 84B on which a groove 91A corresponding to the higher part 89A of the rolling edge 90 and higher parts 91B corresponding to the groove parts 89B of the rolling edge 90 are concentrically formed is formed around the bolt hole 84A.

Referring to FIGS. 33(A) to 33(C) and 34(B) that correspond to FIGS. 32(A) to 32(C) and 34(A), as shown by adding an additional letter "X" to the reference numerals of corresponding parts, the brace plate 83 will be subjected to form rolling processing by the rolling tool TO2 similarly to the processing on the brace sheet 84 except that rolling edges 90X in rolling dies 87LX and 87RX are different from 90 in shape.

As shown in FIG. 34(B), in corresponding relationship to the rolling edges 90 of the rolling dies 87L and 87R to process the brace sheet 84, the rolling edges 90X of the rolling dies 87LX and 87RX have one recessed part 89BX having a shape corresponding to the one projected part 89A of the rolling edge 90, and also two higher parts 89AX having a shape corresponding to the two recessed parts 89B on its both sides.

Thereby, as shown in FIG. 33(A), when form rolling processing is performed on the brace plate 83 with the rolling dies 87LX and 87RX, as shown in FIGS. 33(B) and 33(C), a slip-proof surface 83C which is concentrical recessed and projected parts having grooves 91AX at the same concentric position as higher parts 91B on the brace sheet 84 and also has a higher part 91BX at the same concentric position as a groove 91A on the brace sheet 84 is formed around the bolt hole 83B in the brace plate 83 centering the bolt hole 83B.

Figure 35:
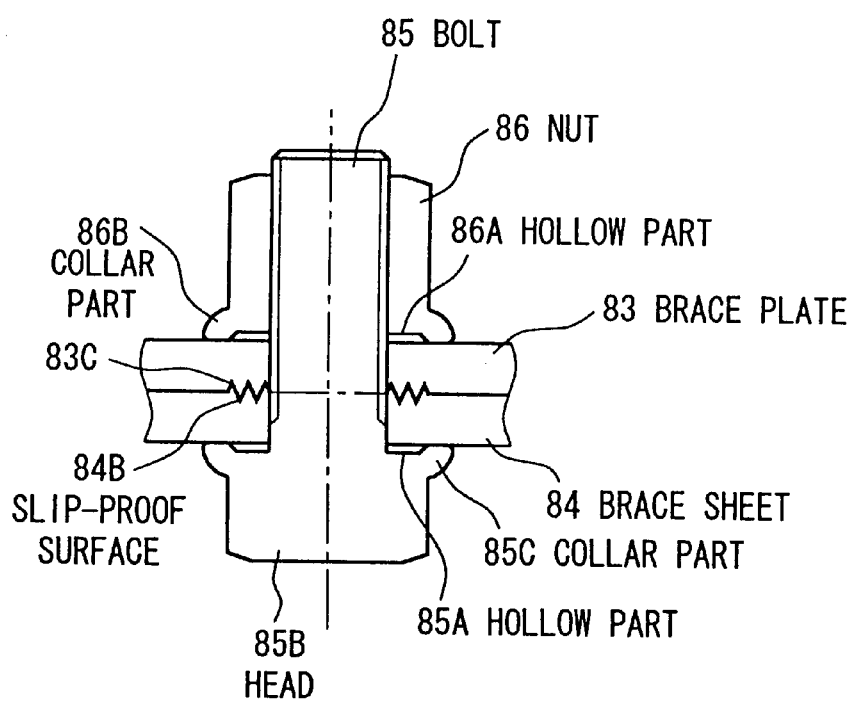
FIG. 35 is a sectional view showing a bolt 85 and a nut 86 that are clamping members.

Since the recessed and projected parts thus formed around the bolt holes 84A and 83B in the brace sheet 84 and the brace plate 83 are at the concentric position and have the shape that the higher parts are mutually fitted to the grooves, as shown in FIG. 35, in the state where the brace sheet 84 is overlapped on the brace plate 83, if a nut 86 is clamped to a bolt 85 passing through the bolt holes 84A and 83B, the slip-proof surface 84B on the brace sheet 84 and the slip-proof surface 83C on the brace plate 83 are mutually joined by the in-raw system.

As shown in FIG. 35, on the inside surfaces of the bolt 85 and the nut 86 to be used as clamping members, hollow parts 85A and 86A are formed at the inside parts that correspond the slip-proof surfaces 84B and 83C.

Furthermore, a contact part to the brace sheet 84 or the brace plate 83 to be clamped in the head 85B of the bolt 85, is spread the outside, and also the peripheral edge has a circular collar part 85C.

Similarly, the nut 86 has a collar part 86B which is spread the outside and has a circular peripheral edge, on the inside surface contacting to the brace sheet 84 or the brace plate 83 to be clamped. Thereby, when the brace sheet 84 and the brace plate 83 are clamped by the head 85B of the bolt 85 and the nut 86, in the state where collar parts 85C and 86B are contacted to the brace sheet 84 and the brace plate 83 to be clamped, the hollow part 85A of the head 85B and hollow part 86A of the nut 86 are not contacted to the subject of clamping; the nut 86 can be further clamped to the bolt 85.

If the nut 86 is clamped to the bolt 85 in this manner, the collar parts 85C and 86B press the brace sheet 84 and the brace plate 83 at the outside position, so that the brace sheet 84 and the brace plate 83 can be clamped without deforming by the above bolt 85 and nut 86.

Figure 36:
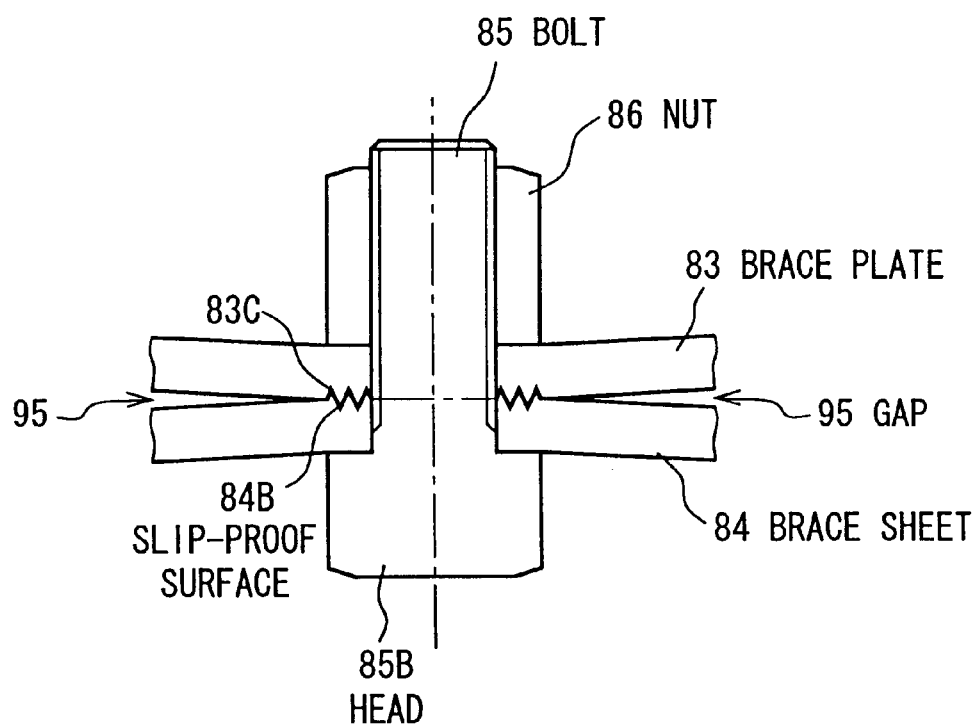
FIG. 36 is a sectional view explaining a clamping member with no hollow part.

In this connection, as shown in FIG. 36, in the case where clamping members which do not have the hollow parts 86A and 85A are applied as the bolt 85 and the nut 86, in the brace sheet 84 and the brace plate 83, there is a fear that a peripheral part clamped by the bolt 85 and the nut 86 is deformed outside and gaps 95 are generated between the brace sheet 84 and the brace plate 83 and a waterdrop comes in and getting rusty. However, such fear can be prevented by applying the structure of FIG. 35.

According to the above configuration, when the strut reinforcing members 80 are fixed to the steel-frame structure 1 (FIG. 26), in each frame structure part 4 of the steel-frame structure 1, fixing sides 84C and 84D on the outside of the brace sheet 84 (FIGS. 27 and 29) are welded to the four corners, and then the brace plates 83 welded to the both ends of the tension member 81 (FIGS. 27 and 30) are clamped by the nuts 86 by passing through the bolt 85 in the state where its bolt hole 83B is located to the bolt hole 84A on the brace sheet 84.

At this time, the slip-proof surface 83C on the brace plate 83 is concentrically overlapped on the slip-proof surface 84B on the brace sheet 84 and they are clamped. Thereby, they are fixed so that the slip-proof surface 83C is fitted to the slip-proof surface 84B by the in-raw system in engaging (FIG. 28).

Practically, when in fixing the strut reinforcing members 80 to the frame structure part 4 in this manner, a length adjusting member 96 (FIG. 26) inserted in the tension member 81 (for example, split frame type or pipe type turnbuckle will be applied to) is turned to adjust the length of the tension members 81 screwed in its both ends. Thereby, the tension members 81 holds a tense state where the four corners of the frame structure part 4 are stretched inward in its longitudinal direction and reinforcing the strut reinforcing members 80.

According to the above configuration, in the state where the strut reinforcing members 80 have been fixed to the frame structure part 4, if an earthquake occurs and cross beam steel members 2A and 2B and vertical steel members 3 is about to do vibrating motion such as distort, the tension members 81 are strained in the extended direction as shown by arrows "g" in FIG. 28.

At this time, since the brace plate 83 has been joined to the brace sheet 84 by the bolt 85 and the slip-proof surface 83A formed around the bolt hole 83B, if the tensile directions "g" are shifted, it turns in the direction along the concentrical recessed and projected parts being the slip-proof surface so as to suit the force in that direction. And at the same time, the brace sheet 84 and the brace plate 83 are held not to mutually slip to the tensile force by bite of the slip-proof surface 84B on the brace sheet 84 and the slip-proof surface 83C on the brace plate 83.

Here, since the recessed and projected parts of the slip-proof surfaces 84B and 83C are engaged so as to be mutually fitted by the in-raw system, even if a momentary tensile force applied from the tension members 81 becomes considerably large, the brace members 82 have sufficient holding power.

In this connection, since the slip-proof surface 84B on the brace sheet 84 and the slip-proof surface 83C on the brace plate 83 have subjected to the form rolling by the rolling dies 87L, 87R, 87LX and 87RX and having the higher parts 91B and 91BX and the grooves 91A and 91AX concentrically ranged around the bolt holes (FIGS. 32 and 33), the above higher parts 91B and 91BX and grooves 91A and 91AX have large intensity obtained by plastic working. Thereby, large holding power which prevents a slip between the brace sheet 84 and the brace plate 83 can be obtained depending on the intensity of the above higher parts 91B and 91BX and grooves 91A and 91AX.

To obtain such large holding power, as shown in FIGS. 27 and 30, as the shape of the joined part on the brace plate 83, the discal joined part 83A which spreads around the bolt hole 83B centering this in a circle comparatively long has been provided. Thus, the length from the bolt hole 83B to the outer circumferential edge of the discal joined part 83A can be extended. So that even if a load from the tension members 81 becomes large, a fear that the brace plate 83 is cracked can be effectively prevented.

Besides, since the brace sheet 84 and the brace plate 83 are clamped using the bolt 85 and the nut 86 that have the hollow parts 85A and 86A inside the collar parts 85C and 86B as clamping members, the brace sheet 84 and the brace plate 83 can be joined without deforming.

FIGS. 37, 38(A) and 38(B) show the results of joint strength tests.

In this joint strength tests, as shown in FIGS. 38(A) and 38(B), in the state where the ends of plate sample steel members T1 and T2 are mutually contacted, a bolt B1 is passed through bolt holes H1 and H2 drilled in the above ends and clamped to a nut B2. Then, a load is applied on the sample steel members T1 and T2 in directions shown by arrows h1 and h2. And a joint strength between the sample steel members T1 and T2, obtained by clamping the bolt B1 to the nut B2, was measured.

Referring to FIG. 37, in the samples of sample numbers 3 and 4, the sample steel members T1 and T2 are joined by clamping a piece of high power bolt having M22 of a bolt diameter (the diameter is 22 [mm]) (bolt using heated special steel) by a clamping torque 5600.

At this time, on the joined surface of the sample steel members T1 and T2, the concentrical slip-proof surfaces 84B and 83C described above with reference to FIGS. 32(A) to 32(C) and 33(A) to 33(C) have been formed by form rolling respectively. These were joined so that the above slip-proof surfaces 84B and 83C were fitted by the in-raw system.

At this time, a limited load to occur a slip, i.e., the joint strength was 172.0 [kN] and 207.5 [kN].

Sample numbers 1 and 2 are slip tests about sample steel members T1 and T2 that do not have the slip-proof surfaces 84B and 83C. The joint strength at this time was 35.5 [kN] and 39.0 [kN].

In this manner, it could be confirmed that in the case where the slip-proof surfaces 84B and 83C are formed by form rolling as the sample numbers 3 and 4, remarkably large slip yield strength that is 5.09 times in a mean value can be obtained comparing with the case where the slip-proof surfaces 84B and 83C are not formed as the sample numbers 1 and 2.

Then, in sample numbers 5 and 6, when the sample steel members T1 and T2 were clamped with a medium bolt (bolt using unheated steel) as a clamping member by a clamping torque 4800, 168.0 [kN] and 208.0 [kN] of joint strength could be obtained.

In this manner, it could be confirmed that even in the case where a medium bolt not using special steel is used as a bolt, 5.04 times of joint strength in a mean value can be obtained comparing with the case where the slip-proof surfaces 84B and 83C have not been formed.

In the samples of sample numbers 9 and 10 in FIG. 37, a joint strength in the case where the high power bolt of which the bolt diameter is M16 (16 [mm]) smaller than M22 was used and the slip-proof surface 84B on the sample steel member T1 and the slip-proof surface 83C on the sample steel member T2 were clamped by a clamping torque 3000 was 180.0 [kN] and 177.1 [kN].

In the samples of sample numbers 11 and 12, a joint strength in the case where the sample steel members T1 and T2 were clamped by a clamping torque 1550 using a medium bolt was 157.0 [kN] and 134.2 [kN].

In this manner, even if the bolt diameter was changed from 22 [mm] to a narrow 16 [mm] and the bolt was changed from the high power bolt to a medium bolt, 2.90 times of joint strength was obtained in a mean value comparing with the cases of the sample numbers 1 and 2.

On the other hand, in the samples of sample numbers 7 and 8, when the sample steel members T1 and T2 not having the slip-proof surfaces 84B and 83C on the joined surface are clamped with two pieces of high power bolts by a clamping torque 5600 and subjected to a joint strength test, a joint strength was 65.2 [kN] and 79.4 [kN].

In this manner, it could be confirmed that in the case where the sample steel members T1 and T2 not having the slip-proof surfaces 84B and 83C are joined with two pieces of bolts, a joint strength becomes almost twice comparing with the case of using a piece of bolt (sample numbers 1 and 2), however, even in the case where it is compared with the case of two pieces bolts (sample numbers 7 and 8), the case where these have the slip-proof surfaces 84B and 83C (sample numbers 3 and 4, 5, 6, 9 and 10, and 11 and 12) is 2.01 to 2.62 times larger in joint strength.

(2) Other Embodiments (2-1) In the aforementioned embodiment, it has dealt with the case where the hollow parts 85A and 86A are provided inside the collar part 85C of the bolt 85 and the collar part 86B of the nut 86 as clamping means, as shown in FIG. 35. However, the present invention is not only limited to this but also as clamping means, other means such as a bolt, nut, rivet or the like that do not have the hollow parts 85A and 86A may be used.

Also in this manner, joining effect that can be obtained by fitting the slip-proof surfaces 84B and 83C by the in-raw system can be obtained.

(2-2) Moreover, in the aforementioned embodiment, as shown in FIG. 30, the brace plate 83 which has the discal joined part 83A at the end is applied. However, various forms other than disc can be used-as its shape.

(2-3) In the aforementioned embodiment, it has dealt with the case where the brace sheet 84 and the brace plate 83 are form-rolled by the pairs of rolling dies 87L and 87R and 87LX and 87RX, as described above with reference to FIGS. 32(A) to 32(C) and 33(A) to 33(C). However, rolling tools are not only limited to this but also various configuration can be applied. In short, rolling tools which can form the slip-proof surfaces 84B and 83C having concentrical recessed and projected parts may be applied.

(2-4) In the aforementioned embodiment, also if using a brace sheet 84 and a brace plate 83 that have the slip-proof surfaces 84B and 83C, on which the surface has subjected to rust eliminating processing or plating treatment, similar effect to the aforementioned embodiment can be obtained.

(2-5) In the case of FIGS. 29 and 30, it has dealt with the case where the slip-proof surfaces 84B and 83C are formed around the one bolt hole 84A or 83B as the brace sheet 84 and the brace plate 83. However, instead of this, as shown in FIGS. 39 to 41, one or plural (in this case, two) bolt holes 84E and 84F and 83D and 83F may be provided on the slip-proof surfaces 84B and 83C, and the brace sheet 84 and the brace plate 83 may be joined by two pieces of bolts 86 that pass through these two bolt holes respectively.

Thereby, since the slip-proof surfaces 84B and 83C are engaged so as to mutually fitted by the in-raw system, large joint strength can be obtained, besides, as a clamping bolt, a bolt having a smaller diameter than the case of FIGS. 29 and 30 (thus, it can be get at a moderate price.) can be used.

Figure 39:
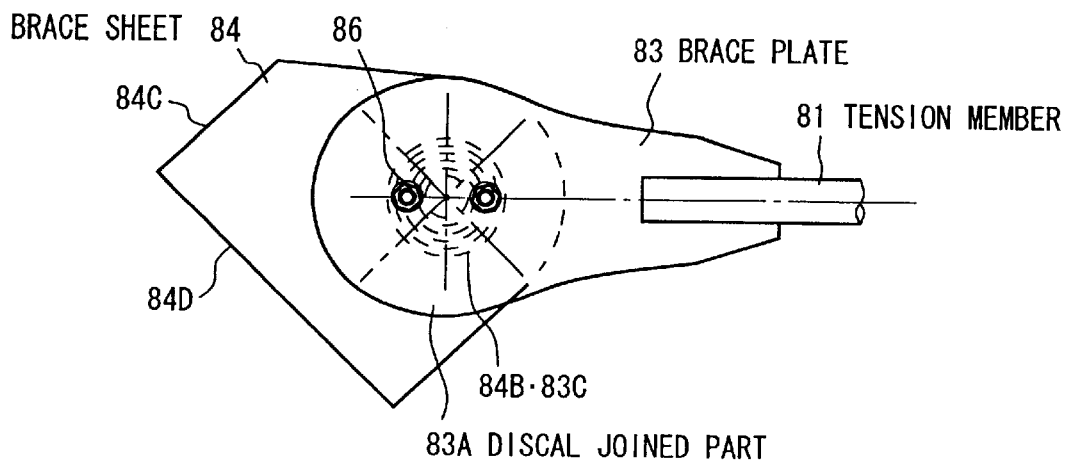
FIG. 39 is a plan view showing a brace member 83 of another embodiment.
Figure 40:
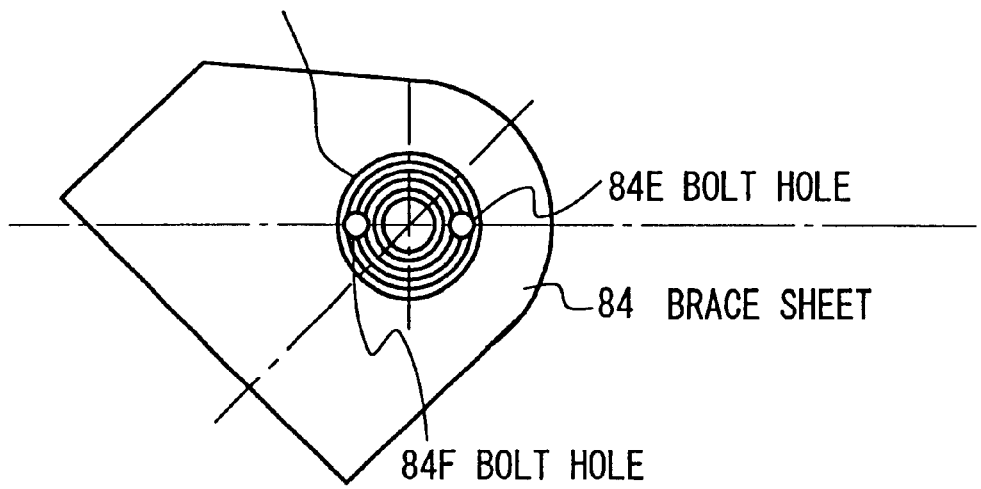
FIG. 40 is a plan view showing a brace sheet 84 in FIG. 39.
Figure 41:
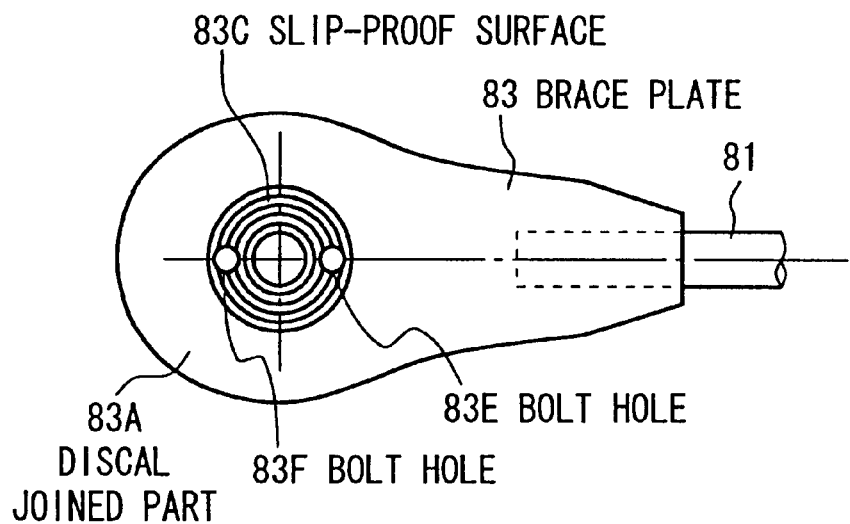
FIG. 41 is a plan view showing a brace plate 83 in FIG. 39.
Figure 42:
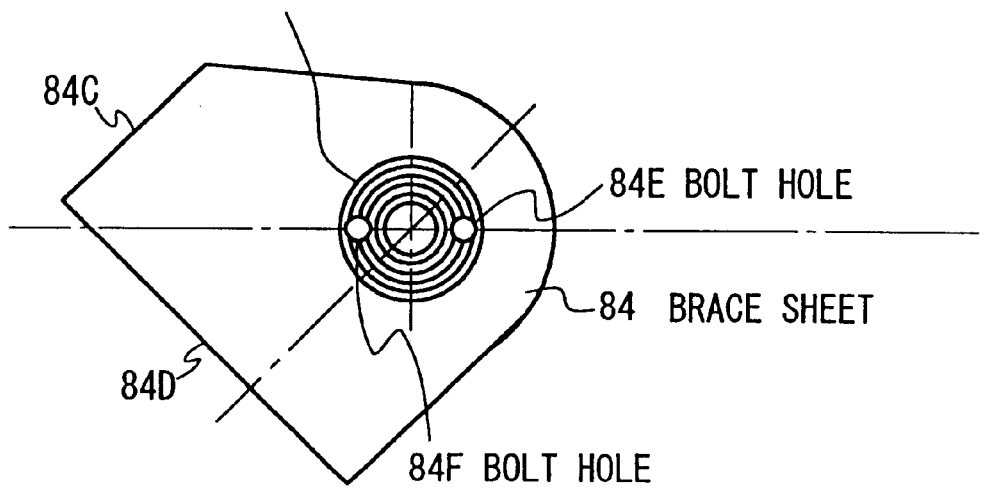
FIG. 42 is a plan view showing a brace sheet 84 of further embodiment.
Figure 43:
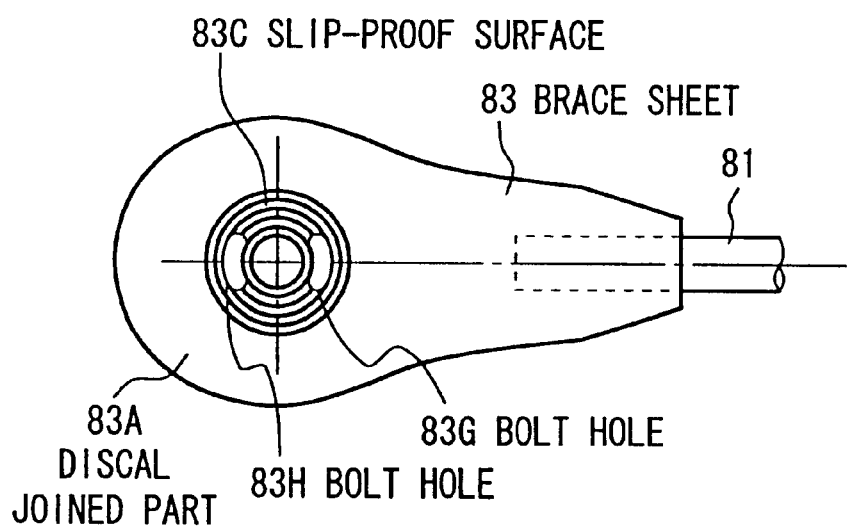
FIG. 43 is a plan view showing a brace plate 83 to be used along with the brace sheet 84 of FIG. 42.

(2-6) Instead of the embodiment of FIGS. 39 to 41, as shown in FIGS. 42 and 43, as bolt holes 83G and 83H in one of the brace sheets 84 and 83, e.g., the brace plate 83, holes which are extended in arcs in the direction along the circumference of the concentrical recessed and projected parts may be applied. In this manner, the brace sheet 84 and the brace plate 83 can be joined by the joint strength of the slip-proof surfaces 84B and 83C.

In this connection, since the two pieces of bolts function to hold the state where the slip-proof surface 84B on the brace sheet 84 and the slip-proof surface 83C on the brace plate 83 are joined by engaging so as to fit by the in-raw system, they are unnecessary to be joined by contacting to the bolt holes.

Figure 3:
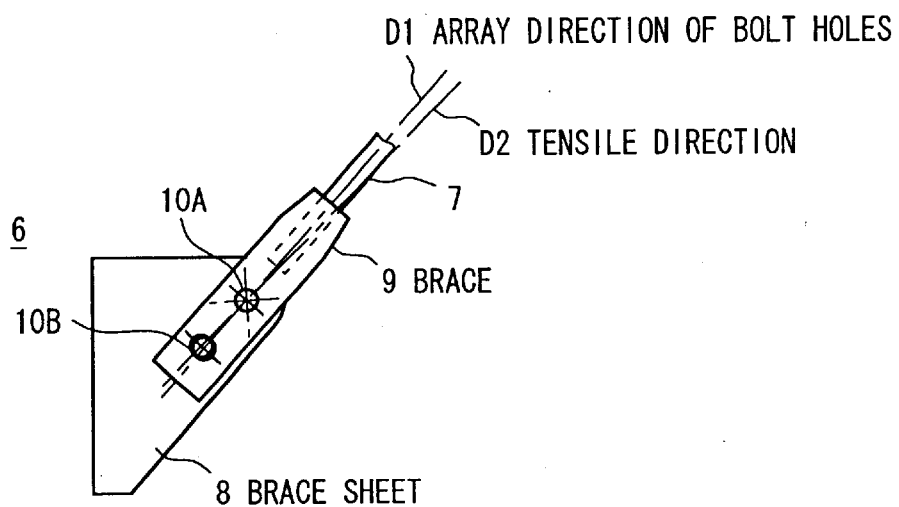
FIG. 3 is a front view explaining the problem of the brace member 6 of FIG. 2.
Figure 4:
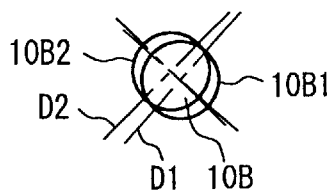
FIG. 4 is a schematic diagram explaining the problem along with FIG. 3.

Then, as shown in FIG. 43, if the bolt holes 83G and 83H in one of the brace sheets 84 and 83, e.g., the brace plate 83, are formed in arcs, as described above with reference to FIGS. 3 and 4, even if a tensile direction D2 to the tension member 81 was deviated from an array direction D1 of the bolt holes on the brace plate 84, the discal joined part 83A on the brace plate 83 can be turned in the circumference direction along the recessed and projected parts of the slip-proof surface 83C; and thus, the joined state, engaged by the in-raw system, can be stably kept without occurring an abnormality. Therefore, strut reinforcing members 80 can be further easily attached to a frame structure part 4.

Figure 44:
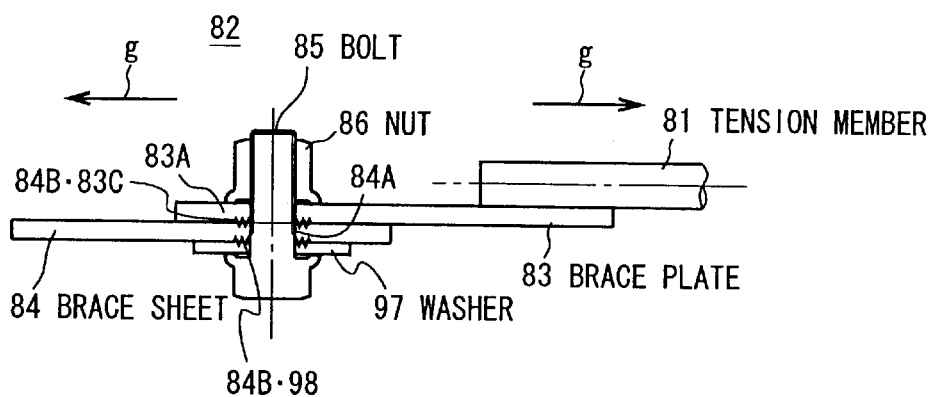
FIG. 44 is a side sectional view showing a brace member 82 of further embodiment.

(2-7) FIG. 44 shows further embodiment. A brace sheet 84 in this case has a slip-proof surface 84B around a bolt hole 84A on both sides.

On one hand, the slip-proof surface 84B on the brace sheet 84 on the brace plate 83 side is fitted to the slip-proof surface 83C formed on the brace plate 83 by the in-raw system. On the other hand, the slip-proof surface 84B on the brace sheet 84 on the opposite side to the brace plate 83 is fitted to a slip-proof surface 98 formed on the surface of a washer 97 on the brace sheet 84 side by the in-raw system.

Therefore, the brace sheet 84 and the brace plate 83 can be joined via the washer 97 in the state where the slip-proof surfaces 84B and 83C are engaged by the in-raw system, by clamping a nut 86 to a bolt 85.

According to the embodiment of FIG. 44, since the slip-proof surfaces 84B are formed on the both sides of the brace sheet 84, the brace plate 83 can be joined to the either surface of the brace sheet 84. Thus, when the strut reinforcing member 80 is attached to the frame structure part 4 of the steel-frame structure 1 (FIG. 26), it can be further easily attached.

By the way, if the brace sheet of FIG. 42 is used when brace members 82 are fixed by welding to the four corners of the frame structure part 4, it can be welded to each position of the four corners without paying attention to the face of the brace sheet 84. As a result, even if which side of the brace sheet 84 is on the brace plate 83 side, the slip-proof surface 84 formed on the surface on the above brace plate 83 side can be fitted to the slip-proof surface 83C formed on the surface on the above brace plate 83 side. Thus, the fixing work can be further easily simplified.

INDUSTRIAL APPLICABILITY

The present invention is applicable to a steel member or a reinforcing member to form a steel-frame structure such as a structure, bridge, etc.

What is claimed is:

1. A joined surface processing method utilized for having joined surfaces of first and second steel members overlapped each other and fixing said first and second steel members with a pressure by a connecting member passing through connecting holes drilled in said first and second members, so as to join said first and second steel members, wherein rolling dies having a rolling edge that has one or plural concentric edge parts on a conical incline each composed of a mountain-shaped portion and a valley-shaped portion having a radius of curvature and extending from an inner edge to an outer edge is rolled on the joined surface of said steel member in a state where said conical incline is contacted to the joined surface of said steel member in a direction perpendicular to said joined surface of said steel member and pressed by prescribed pressure, so that a slip-proof surface having corresponding concentric recessed and projected parts is formed on said joined surface each having a corresponding radius of curvature, whereby a change of the radius curvature of the edge parts from the inner edge to the outer edge thereof is preselected to a change of the radius of curvature of the corresponding concentric recessed and projected parts, and said steel member is non-bent or non-curved to form said slip-proof surfaces.

2. A steel member joining method for making the joined surfaces of first and second steel members mutually overlap and fixing said first and second steel members with a pressure by a connecting member passing through connecting holes drilled in said first and second steel members, and thereby joining said first and second steel members, wherein:

with respect to the joined surface of said first steel member, before joining with first rolling dies having a rolling edge that has one or plural concentric edge parts on a first conical incline each composed of a mountain-shaped portion and a valley-shaped portion, having a radius of curvature, and extending from an inner edge to an outer edge, a first slip-proof surface having corresponding concentric recessed and projected parts composed of concentric mountain-shaped portions and grooved portions is formed around said connecting holes of said first steel member by rolling said first conical incline of said first rolling dies along with the locus of the concentric circle focusing said connecting holes;

with respect to the joined surface of said second steel member, before joining, with second rolling dies having a rolling edge that has on one or plural concentric edge parts on a second conical incline each composed of a valley-shaped portion alternating with said mountain-shaped portion of said first rolling dies and a mountain-shaped portion alternating with said valley-shaped portion of said first rolling dies, having said radius of curvature, and extending from an inner edge to an outer edge, a second slip-proof surface having corresponding concentric projected and recessed parts composed of concentric grooved portions and mountain-shaped portions around said connecting holes of said second steel member is formed by rolling said second conical incline of said second rolling dies along with the locus of the concentric circle focusing said connecting holes;

when joining, said first and second steel members are joined with said first and second slip-proof surfaces overlapped wherein said mountain-shaped portions of said concentric recessed and projected parts of said first slip-proof surface is matingly fitted with said grooved portions of said concentric recessed and projected parts of said second slip-proof surface, and said grooved portions of said concentric recessed and projected parts of said first slip-proof surface is matingly fitted with said mountain-shaped portions of said concentric recessed and projected parts of said second slip-proof surface; and said first and second steel members are non-bent or non-curved to form said first and second slip-proof surfaces.

3. A steel member joining method for making the joined surfaces of first and second steel members mutually overlap and fixing said first and second steel members with a pressure by a connecting member passing through connecting holes drilled in said first and second steel members, and thereby joining said first and second steel members, wherein with respect to the joined surface of said first steel member, before joining, with first rolling dies having a rolling edge that has one or plural concentric edge parts on a first conical incline each composed of a mountain-shaped portion and a valley-shaped portion, having a radius of curvature, and extending from an inner edge to an outer edge, a first slip-proof surface having corresponding concentric recessed and projected parts composed of concentric mountain-shaped portions and grooved portions is formed around said connecting holes of said first steel member by rolling said first conical incline of said first rolling dies along with the locus of the concentric circle focusing said connecting holes;

when joining, said first and second steel members are joined with said mountain-shaped portions of said concentric recessed and projected parts of said first slip-proof surface of said first steel member being embedded in a joined surface of said second steel member according to the pressure strength of said connecting member; and said first and second steel members are non-bent or non-curved to form said first and second slip-proof surfaces.

4. A method of joining steel members comprising the steps of:

drilling connecting holes in the top ends where first and second joined surfaces of first and second steel members to be mutually joined are overlapped so as to pass through said first and second steel members, wherein:

with respect to the joined surface of said first steel member, with first rolling dies having a rolling edge that has one or plural concentric edge parts on a first conical incline each composed of a mountain-shaped portion and a valley-shaped portion, having a radius of curvature, and extending from an inner edge to an outer edge, a first slip-proof surface having corresponding concentric recessed and projected parts composed of concentric mountain-shaped portions and grooved portions is formed around said connecting holes of said first steel member by rolling said first conical incline of said first rolling dies along with the locus of the concentric circle focusing said connecting holes;

with respect to the joined surface of said second steel member, with second rolling dies having a rolling edge that has one or plural concentric edge parts on a second conical incline each composed of a valley-shaped portion alternating with said mountain shaped portion of said first rolling dies and a mountain-shaped portion alternating with said valley-shaped portion of said first rolling dies, having said radius of curvature, and extending from an inner edge to an outer edge, a second slip-proof surface having corresponding concentric projected and recessed parts composed of concentric grooved portions and mountain-shaped portions is formed around said connecting holes of said second steel member by rolling said second conical incline of said second rolling dies along with the locus of the concentric circle focusing said connecting holes;

said first and second steel members are fixed by clamping in the thickness direction by said connecting member passing through said first and second connecting holes of said first and second steel members with said first and second slip-proof surfaces overlapped wherein said mountain-shaped portions of said concentric recessed and projected parts of said first slip-proof surface is matingly fitted with said grooved portions of said concentric recessed and projected parts of said second slip-proof surface, and said grooved portions of said concentric recessed and projected parts of said first slip-proof surface is matingly fitted with said mountain-shaped portions of said concentric recessed and projected parts of said second slip-proof surface; and said first and second steel members are non-bent or non-curved to form said first and second slip-proof surfaces.

* * * * *